US011295584B2

(12) United States Patent
Carlson et al.

(10) Patent No.: US 11,295,584 B2
(45) Date of Patent: Apr. 5, 2022

(54) SECURITY ALARM SYSTEM COMPRISING AN RFID TAG

(71) Applicant: 1010210 B.C. Ltd., Surrey (CA)

(72) Inventors: Paul Justin Carlson, Surrey (CA); Julian Paul Carlson, Surrey (CA)

(73) Assignee: 1010210 B.C. Ltd., Surrey (CA)

( * ) Notice: Subject to any disclaimer, the term of this patent is extended or adjusted under 35 U.S.C. 154(b) by 0 days.

(21) Appl. No.: 17/055,287

(22) PCT Filed: May 17, 2019

(86) PCT No.: PCT/CA2019/000071
§ 371 (c)(1),
(2) Date: Nov. 13, 2020

(87) PCT Pub. No.: WO2019/218050
PCT Pub. Date: Nov. 21, 2019

(65) Prior Publication Data
US 2021/0209907 A1 Jul. 8, 2021

Related U.S. Application Data

(60) Provisional application No. 62/672,593, filed on May 17, 2018.

(51) Int. Cl.
*G08B 13/08* (2006.01)
*G06K 7/10* (2006.01)
*G06K 19/07* (2006.01)

(52) U.S. Cl.
CPC ......... *G08B 13/08* (2013.01); *G06K 7/10425* (2013.01); *G06K 19/0723* (2013.01)

(58) Field of Classification Search
CPC . G08B 13/08; G06K 7/10425; G06K 19/0723
USPC ....................................... 340/545.1
See application file for complete search history.

(56) References Cited

U.S. PATENT DOCUMENTS

| 3,986,183 A | 10/1976 | Fujiwara |
| 4,296,410 A | 10/1981 | Higgs et al. |
| 4,954,812 A | 9/1990 | Lebron |
| 5,164,705 A | 11/1992 | Dunagan et al. |

(Continued)

FOREIGN PATENT DOCUMENTS

| CA | 3100201 A1 | 11/2020 |
| CN | 201780643 | 3/2011 |

(Continued)

OTHER PUBLICATIONS

Vision Security: "Installation & Operation Manual ZD 2012", published Feb. 10, 2011.

(Continued)

*Primary Examiner* — Kam Wan Ma
(74) *Attorney, Agent, or Firm* — Nicholas Garner; Oyen Wiggs Green & Mutala LLP

(57) ABSTRACT

A security alarm system comprises an RFID tag mounted on a window, a sensor including an RFID reader mounted on the window, and a control panel. A distance between the sensor and the RFID tag increases when the window is opened. The sensor signals the control panel to trigger an alarm when the distance, between the sensor and the RFID increases beyond a threshold distance and the sensor cannot read the RFID tag.

20 Claims, 29 Drawing Sheets

(56) References Cited

U.S. PATENT DOCUMENTS

| | | |
|---|---|---|
| 5,434,500 A | 7/1995 | Hauck et al. |
| 5,714,932 A | 2/1998 | Castellon et al. |
| 6,400,267 B1 | 6/2002 | Gordon-Levitt et al. |
| 6,577,238 B1 | 6/2003 | Whitesmith et al. |
| 7,079,034 B2 | 7/2006 | Stilp |
| 7,221,230 B2 | 5/2007 | Partridge et al. |
| 8,410,937 B2* | 4/2013 | Collins ............ G06K 19/07345 340/572.4 |
| 8,773,263 B2 | 7/2014 | Thibault |
| 8,933,789 B1* | 1/2015 | Fink ................. G06K 19/07762 340/10.1 |
| 9,659,470 B2 | 5/2017 | Smith |
| 9,695,015 B1* | 7/2017 | Marinelli .............. B66B 13/185 |
| 9,767,660 B1* | 9/2017 | Skarda ................... G08B 13/08 |
| 9,905,099 B2 | 2/2018 | Carlson et al. |
| 10,249,161 B2 | 4/2019 | Carlson et al. |
| 2001/0030605 A1 | 10/2001 | Novotny |
| 2005/0024207 A1 | 2/2005 | Schebel et al. |
| 2005/0096587 A1 | 5/2005 | Santini, Jr. et al. |
| 2005/0179545 A1 | 8/2005 | Bergman et al. |
| 2007/0279226 A1 | 12/2007 | Whitesmith et al. |
| 2008/0290864 A1 | 11/2008 | Latraverse |
| 2009/0201209 A1 | 8/2009 | Boyle |
| 2010/0102907 A1 | 4/2010 | Schebel et al. |
| 2011/0004916 A1 | 1/2011 | Schiffman et al. |
| 2011/0156905 A1 | 6/2011 | Collins |
| 2012/0089299 A1 | 4/2012 | Breed |
| 2013/0057404 A1 | 3/2013 | Thibault |
| 2013/0057405 A1 | 3/2013 | Seelman et al. |
| 2013/0170532 A1 | 7/2013 | Marozsak et al. |
| 2013/0257611 A1 | 10/2013 | Lamb et al. |
| 2013/0316583 A1 | 11/2013 | Scherer et al. |
| 2014/0340222 A1 | 11/2014 | Thornton et al. |
| 2015/0199888 A1 | 7/2015 | Shapira et al. |
| 2021/0327230 A1 | 10/2021 | Wang et al. |

FOREIGN PATENT DOCUMENTS

| | | |
|---|---|---|
| DE | 20017433 | 3/2001 |
| DE | 202014000574 U1 | 2/2014 |
| DE | 102013217366 A1 | 11/2014 |
| EP | 1860624 A1 | 11/2007 |
| GB | 2356077 | 5/2001 |
| NL | 1000644 C | 12/1996 |
| WO | 2016011564 | 1/2016 |

OTHER PUBLICATIONS

WIPO, International Searching Authority, International Search Report and Written Opinion dated Nov. 5, 2015 in International Patent Application No. PCT/CA2015/050711.

European Search Report dated Feb. 1, 2018 for EP 15 82 4924.

WIPO, International Searching Authority, International Search Report and Written Opinion dated Jul. 23, 2019 in International Patent Application No. PCT/CA2019/000071.

Extended Supplementary European Search Report dated May 14, 2021 for European Patent Application No. EP 19 80 3339.

International Search Report for PCT/CA2020/051582 completed Jul. 14, 2021 and dated Aug. 9, 2021.

\* cited by examiner

SECURITY ALARM SYSTEM COMPRISING AN RFID TAG

BACKGROUND OF THE INVENTION

Field of the Invention

The present invention relates to a security alarm system and, in particular, to a security alarm system comprising an RFID tag mounted on window or a door.

Description of the Related Art

International Patent Application Publication No. WO/2003/046855 which was published on Jun. 5, 2013, in the name of Carlson discloses a security sensor system. The security sensor system includes a window frame defining a window opening, a window sash movable relative to the window frame between open and closed positions, and a sensor unit embedded in the window frame. The sensor unit includes a housing having an inner end within the window frame, an outer end at a surface of the window frame, and a flexible ¼ wave wire antenna extending e.g. longitudinally of the window frame from the housing. The housing contains a sensor switch, a microprocessor an RF transmitter and a battery for emitting signals to a master station or controller. The security sensor system also includes a magnet mounted in the window sash for actuating the sensor switch.

SUMMARY OF THE INVENTION

There is provided security alarm system comprising an RFID tag mounted on a window, a sensor including an RFID reader mounted on the window, and a control panel. A distance between the sensor and the RFID tag increases when the window is opened. The sensor signals the control panel to trigger an alarm when the distance between the sensor and the RFID increases beyond a threshold distance and the sensor cannot read the RFID tag. The RFID tag may be one of a plurality of RFID tags mounted on the window. The sensor may read different ones of the RFID tags as the window is opened. The sensor may signal the control panel a distance that the window is opened based on the RFID tags the sensor reads as the window is being opened. The sensor signals the control panel to trigger an alarm when the sensor cannot read the RFID tag. The security alarm system may be a wireless security alarm system or a wired security alarm system.

There is provided a security alarm system comprising an RFID tag mounted on a door, a sensor including an RFID reader mounted on the window, and a control panel. A distance between the sensor and the RFID tag increases when the door is opened. The sensor signals the control panel to trigger an alarm when the distance between the sensor and the RFID increases beyond a threshold distance and the sensor cannot read the RFID tag. The RFID tag may be one of a plurality of RFID tags mounted on the door. The sensor may read different ones of the RFID tags as the door is opened. The sensor may signal the control panel a distance that the door is opened based on the RFID tags the sensor reads as the door is being opened. The sensor signals the control panel to trigger an alarm when the sensor cannot read the RFID tag. The security alarm system may be a wireless security alarm system or a wired security alarm system.

BRIEF DESCRIPTIONS OF DRAWINGS

The invention will be more readily understood from the following description of the embodiments thereof given, by way of example only, with reference to the accompanying drawings, in which.

Figure 1:
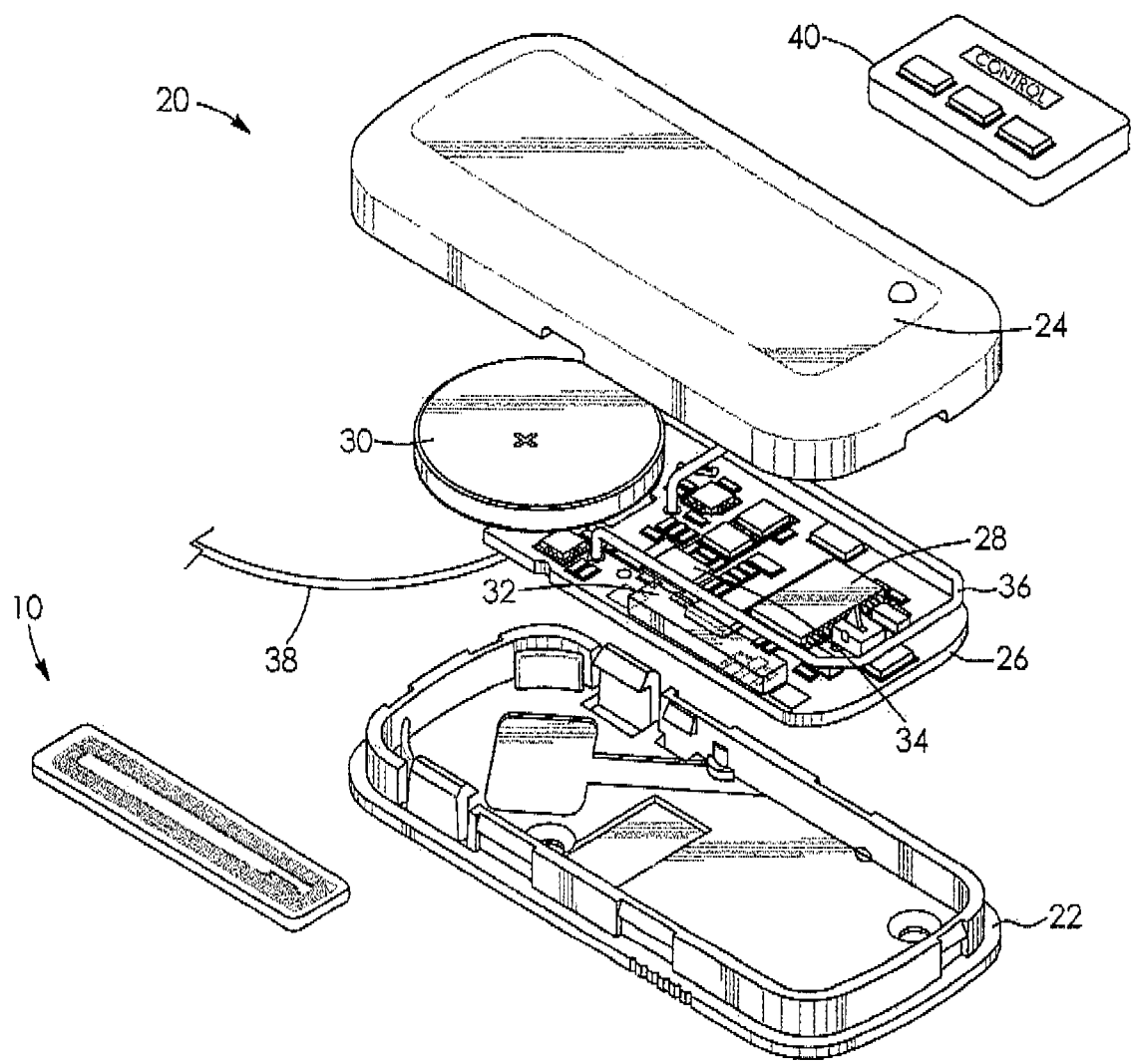
FIG. 1 is a perspective view of an RFID tag and a perspective, exploded view of a sensor for a security alarm system.
Figure 28:
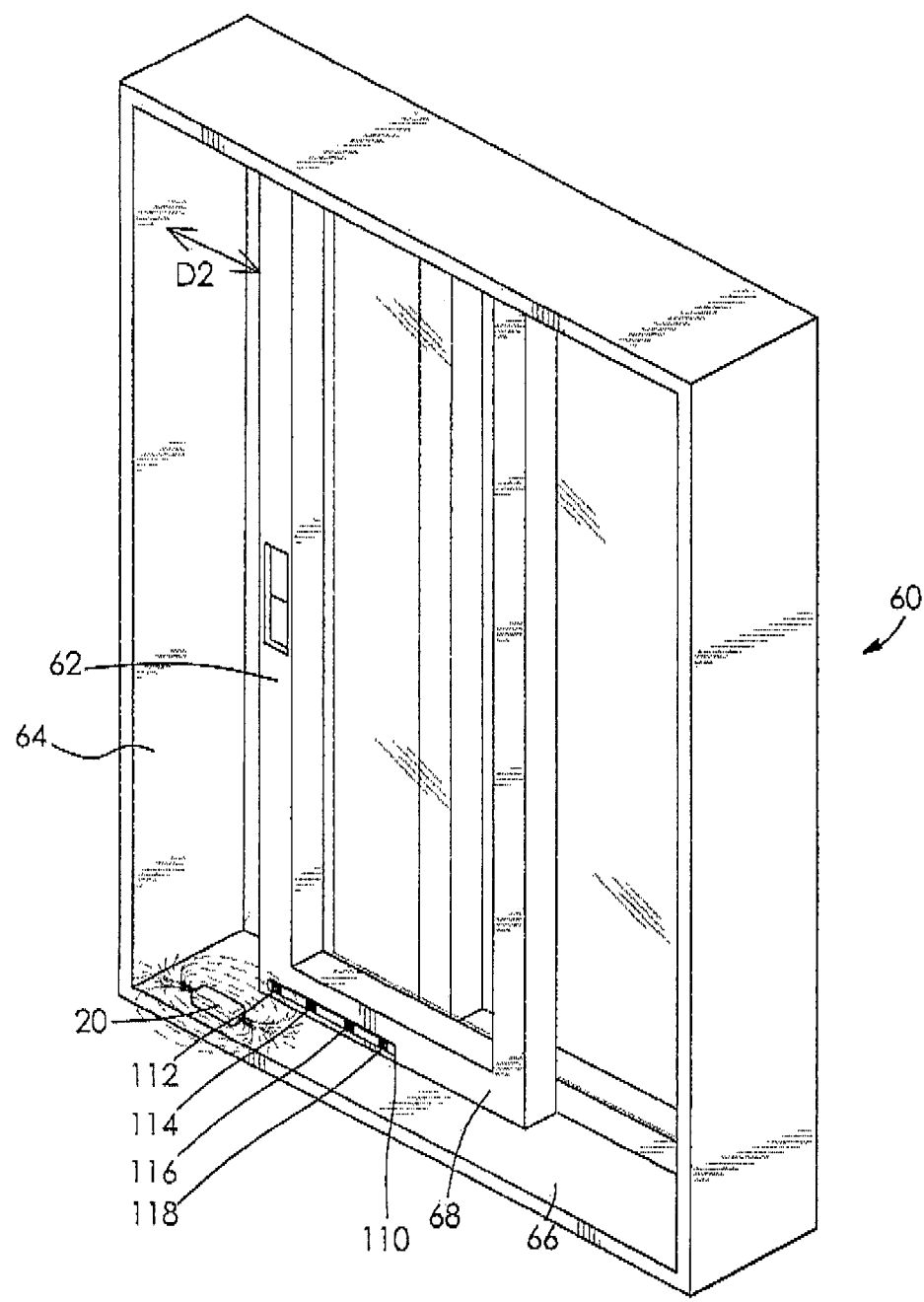
Figure 29:
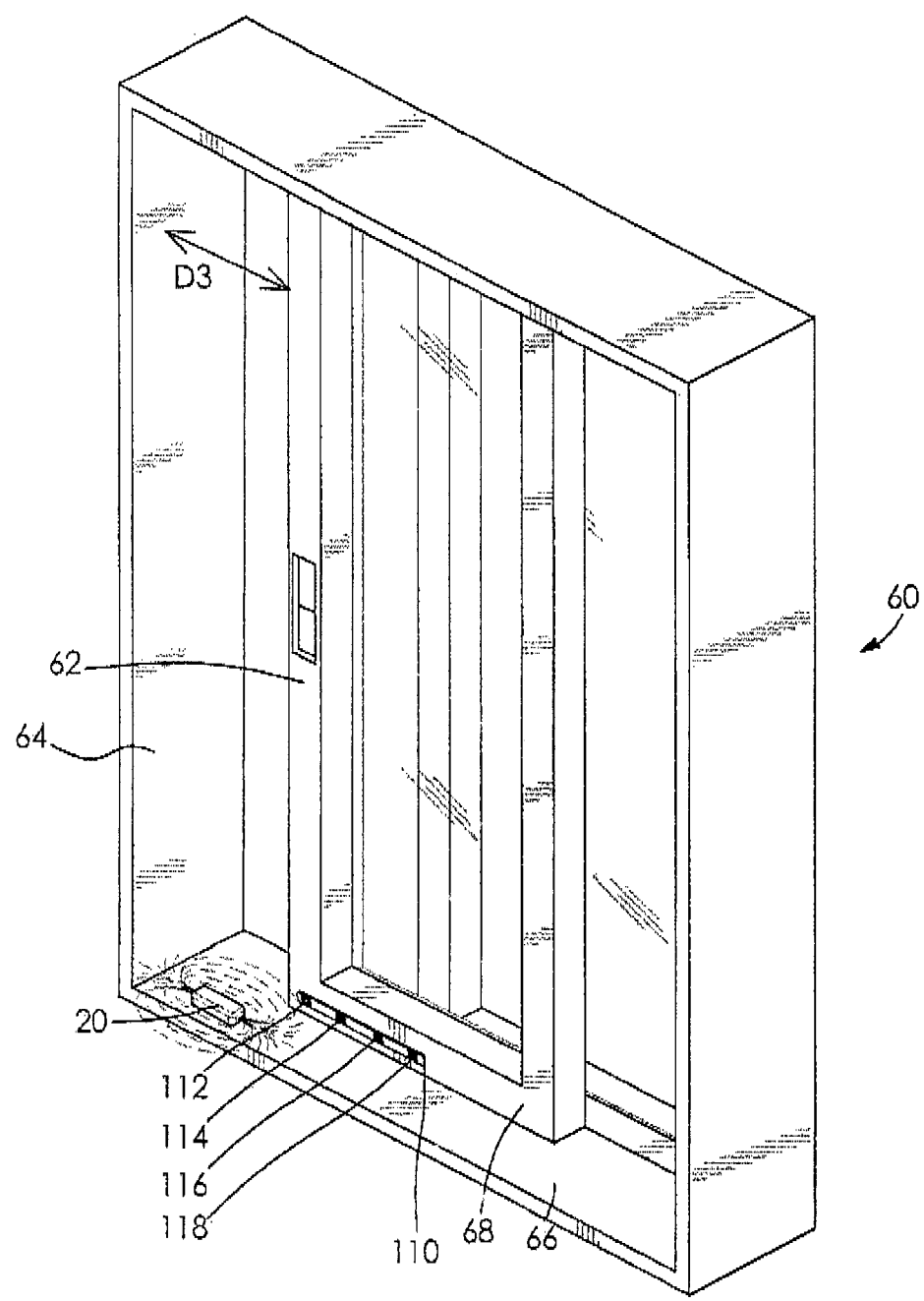

FIG. 28 is a perspective view showing the RFID strip and the sensor being used as the door sensor in the eighth configuration of the security alarm system with the door being open a distance of D2; and FIG. 29 is a perspective view showing the RFID tag and sensor of FIG. 1 being used as the door sensor in the eighth configuration of the security alarm system with the door being open a distance of D3.

DESCRIPTIONS OF THE PREFERRED EMBODIMENTS

Referring to the drawings and first to FIG. 1 there is shown an RFID tag 10 and a sensor 20. The sensor 20 includes a housing 22 having a cover 24. There is a circuit board 26 disposed within the housing 22. A microprocessor 28, a power source which may be in the form of a coin cell battery 30, and an RFID reader 32 are each mounted on the circuit board 26. A radio 34 and an antenna 36 are also mounted on the circuit board 26 and allow the sensor 20 to transmit and receive radio signals. There is a wire 38 which may be electrically and releasably connected to the sensor 20. The radio 34 and antenna 36 allow the sensor 20 to communicate with a control panel 40 as part of a wireless security alarm system. The wire allows the sensor 20 to communicate with a control panel 40 as part of a wired security alarm system. The sensor 20 communicates with control panel 40 to trigger an alarm.

Figure 2:
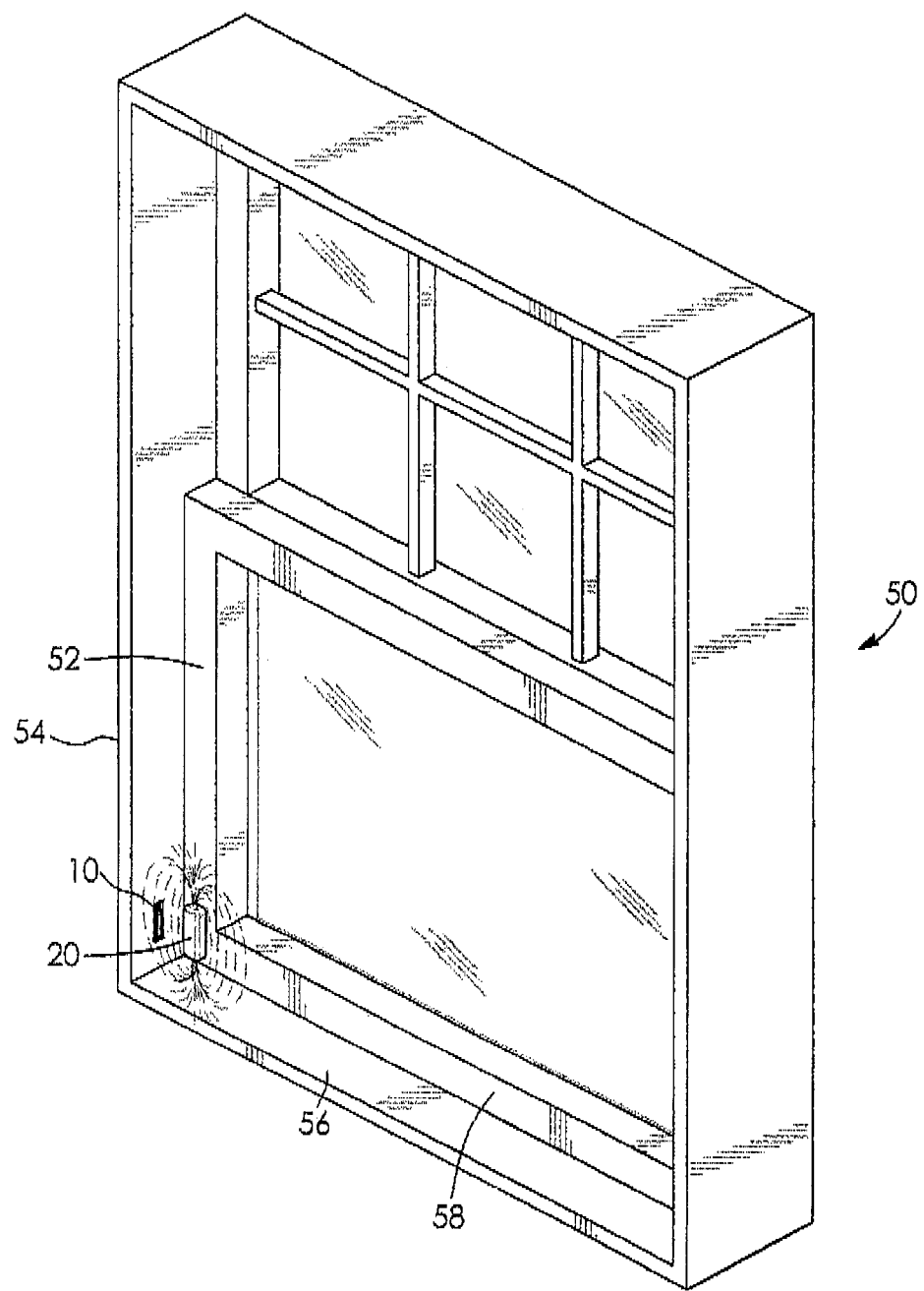
FIG. 2 is a perspective view showing the RFID tag and the sensor being used as the window sensor in a first configuration of a security alarm system with the window closed.
Figure 3:
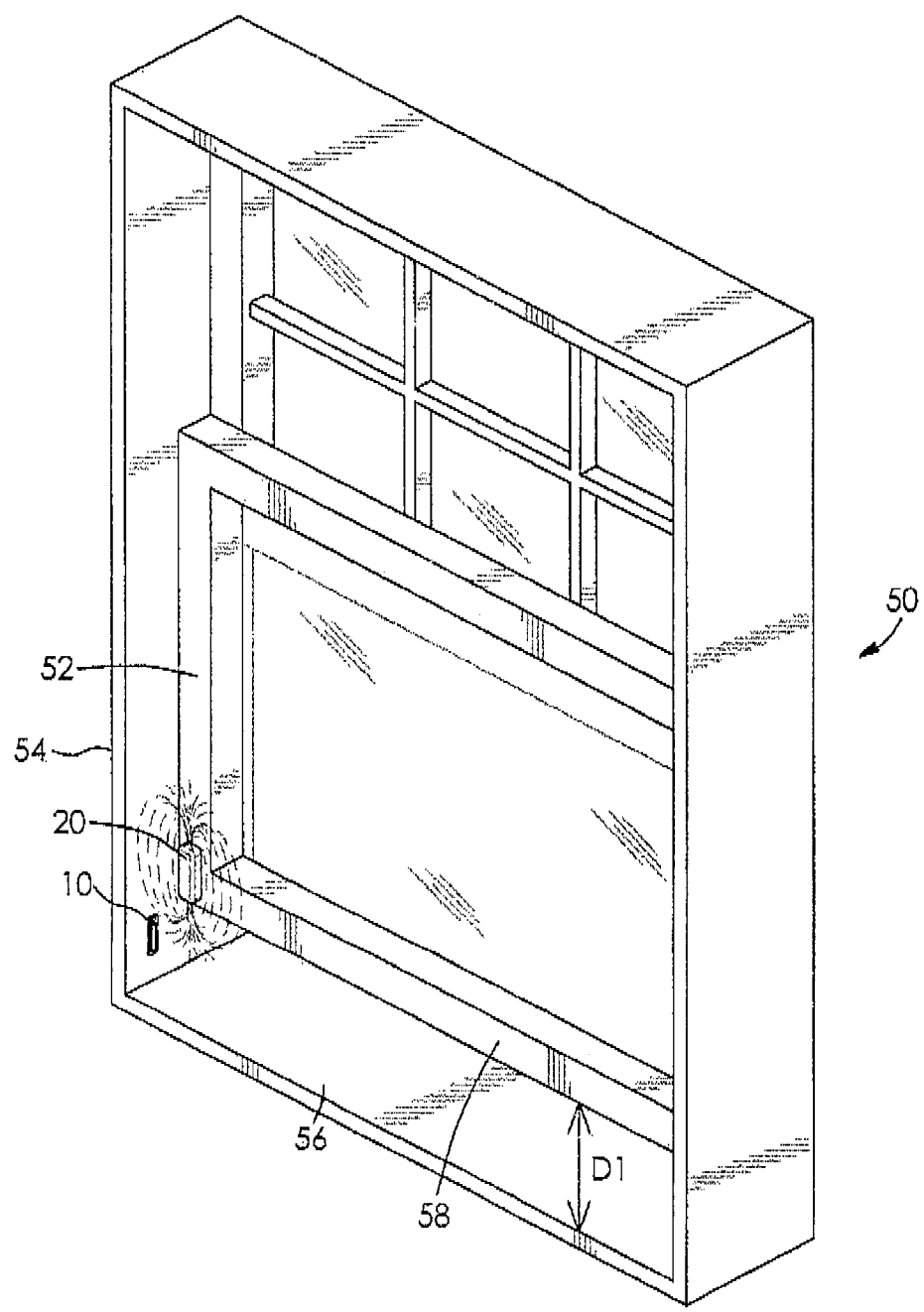
FIG. 3 is a perspective view showing the RFID tag and the sensor being used as a window sensor in the first configuration of the security alarm system with the window being open a distance of D1.
Figure 4:
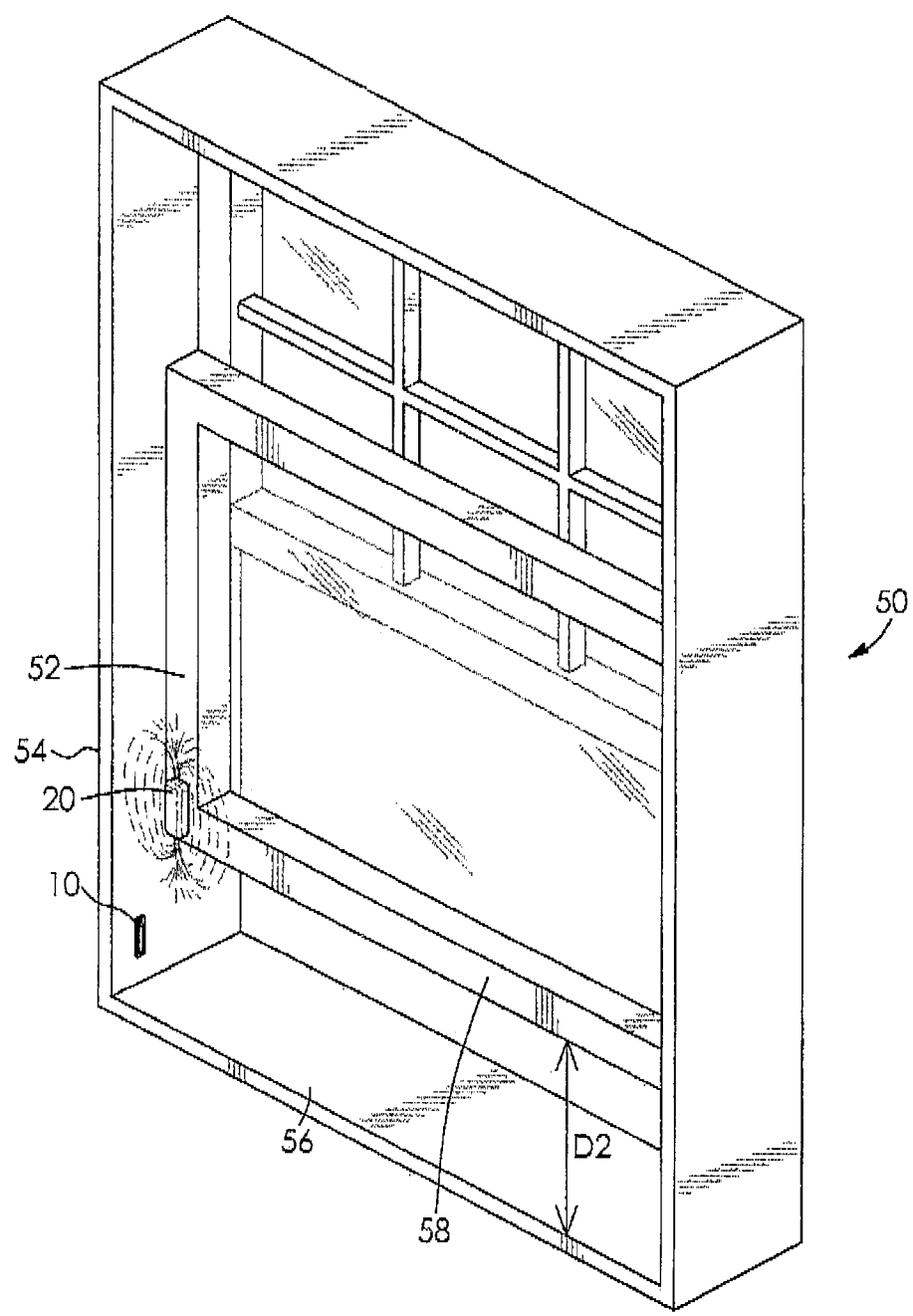
FIG. 4 is a perspective view showing the RFID tag and the sensor being used as the window sensor in the first configuration of the security alarm system with the window being open a distance of D2.

FIGS. 2 to 4 show the RFID tag 10 and the sensor 20 being used as a window sensor for a window 50 in a first configuration of a security alarm system. The first configuration of the security alarm system is a wireless security alarm system in which the sensor 20 is mounted on a stile 52 of the window 50 and the RFID tag 10 is mounted on a side jamb 54 of the window 50 near a sill 56 thereof. The window 50 is fully closed in FIG. 2 with a bottom rail 58 of the window 50 abutting the sill 56 thereof. The sensor 20 is able to read the RFID tag 10 when the window 50 is fully closed and signals that the window 50 is closed. Likewise, as shown in FIG. 3, the sensor 20 is also able to read the REID tag 10 when the window 50 is open up to a threshold distance D1. It is desirable to allow the window 50 to be partially opened for ventilation but not opened enough to allow an intruder to enter through the window 50. The sensor 20 will accordingly not trigger an alarm when the sensor 20 is able to read the RFID tag 10. However, and with reference to FIG. 4, when the window 50 is open to a distance D2, which is greater than the threshold distance D1, the sensor 20 is no longer able to read the RFID tag 10 and an alarm is triggered. The sensor may be mounted on the bottom rail 58 of the window 60 in other configurations.

Figure 5:
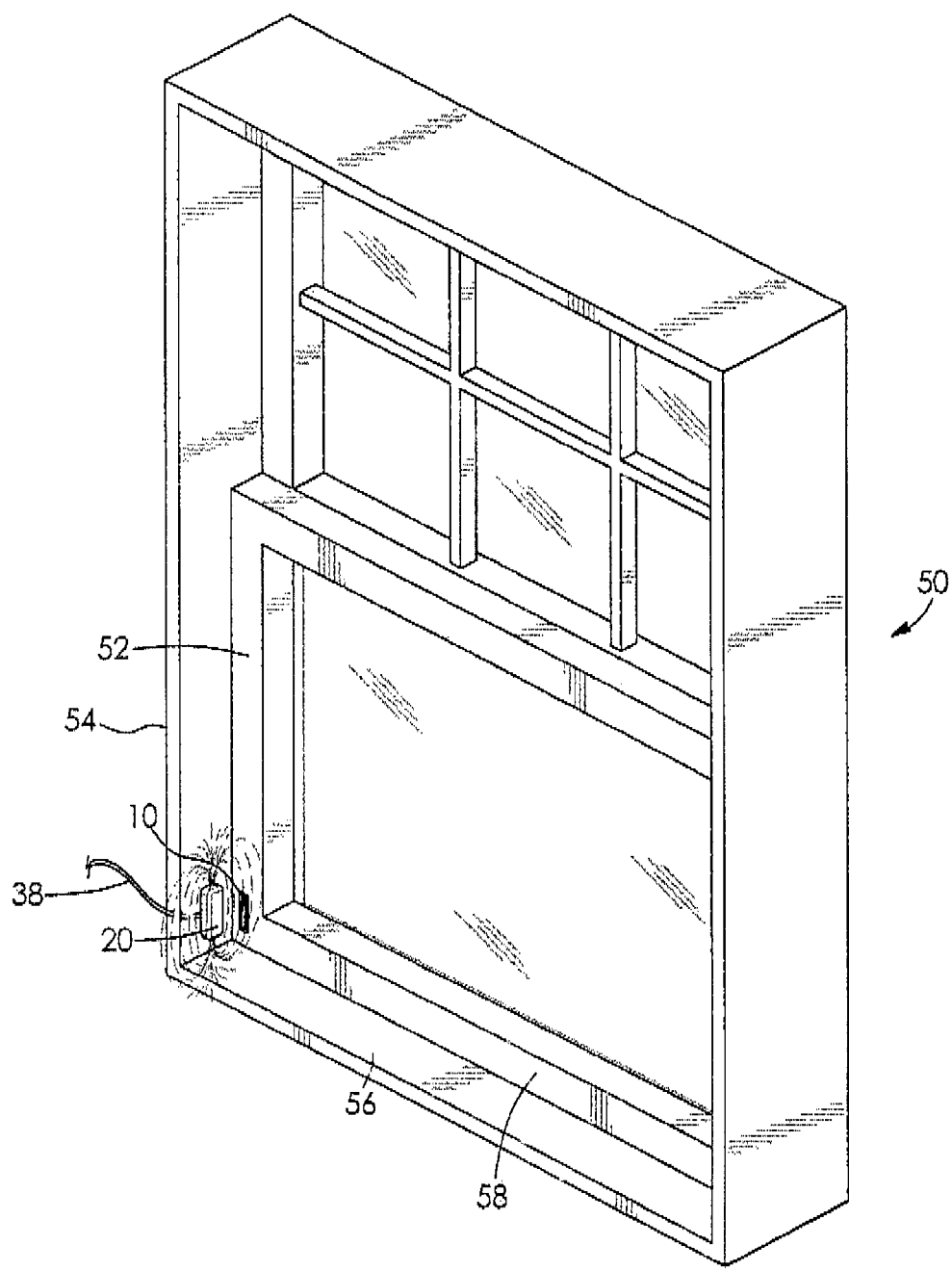
FIG. 5 is a perspective view showing the RFID tag and the sensor being used as a window sensor in a second configuration of a security alarm system with the window closed.
Figure 6:
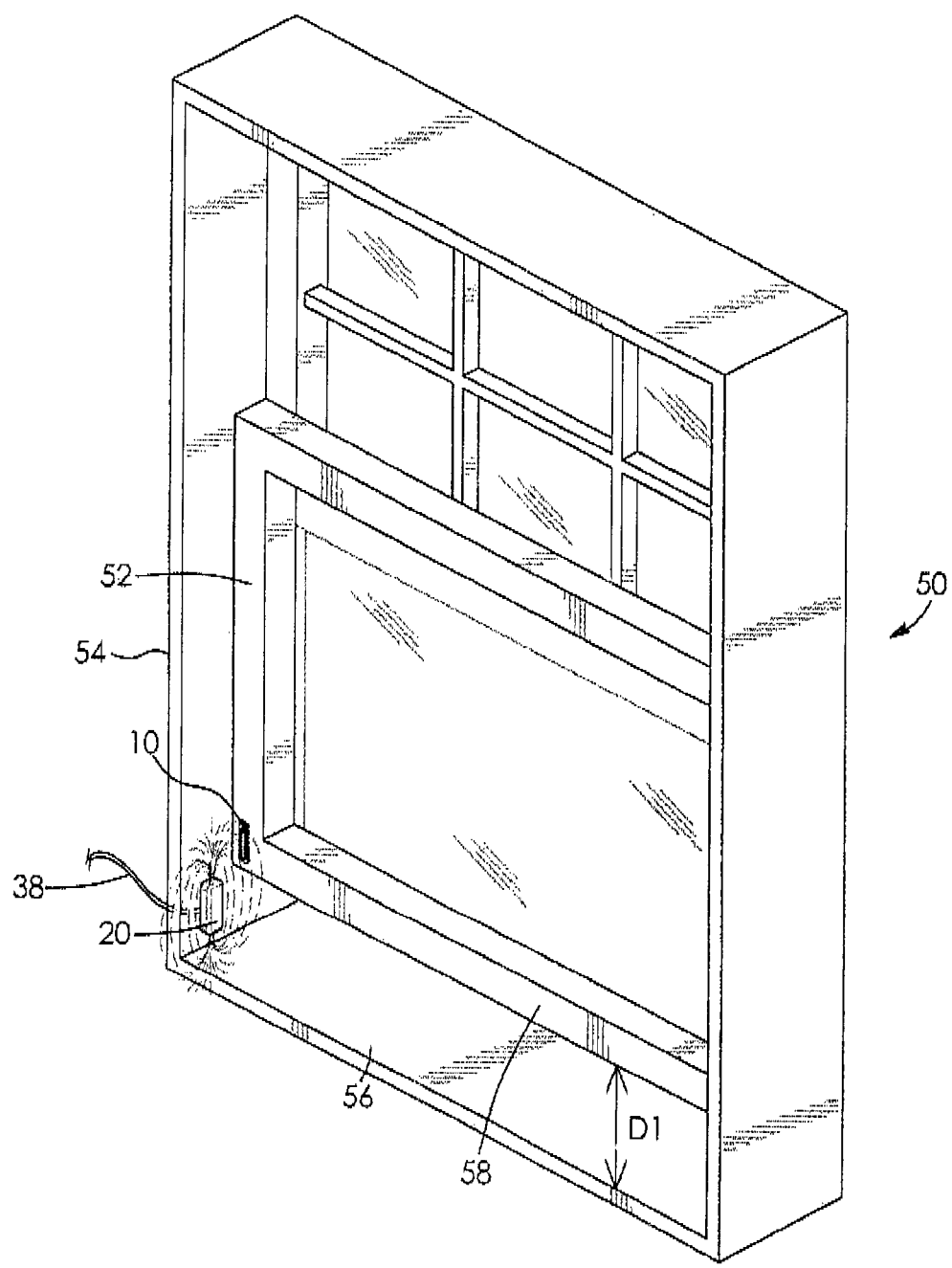
FIG. 6 is a perspective view showing the RFID tag and the sensor being used as the window sensor in the second configuration of the security alarm system with the window being open a distance of D1.
Figure 7:
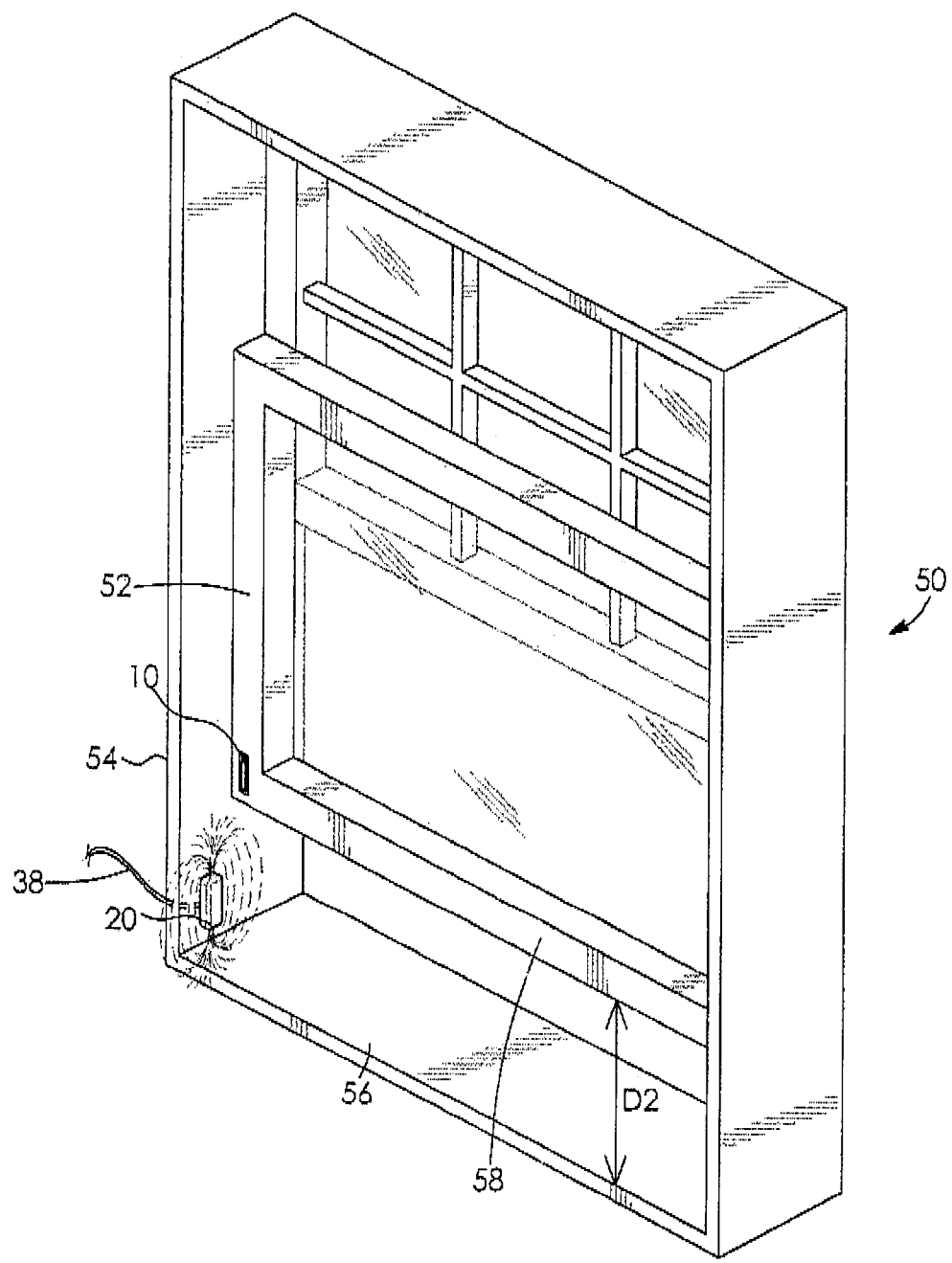
FIG. 7 is a perspective view showing the RFID tag and the sensor being used as the window sensor in the second configuration of the security alarm system with the window being open a distance of D2.
Figure 8:
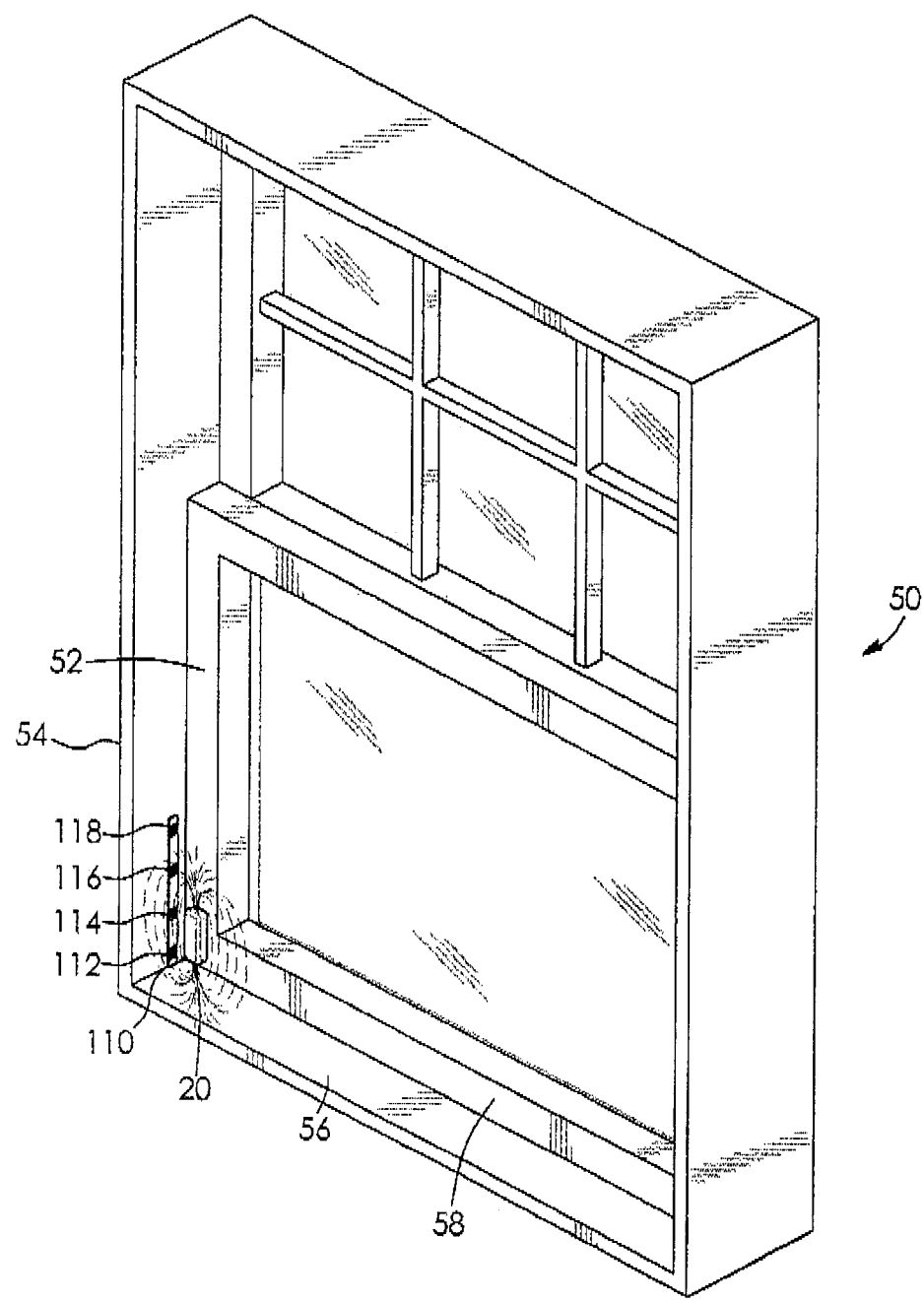
FIG. 8 is a perspective view showing an RFID strip and the sensor being used as a window sensor in a third configuration of a security alarm system with the window closed.

FIGS. 5 to 7 show the RFID tag 10 and the sensor 20 being used as a window sensor for a window 50 in a second configuration of a security alarm system. The second configuration of the security alarm system is a wired security alarm system in which the RFID tag 10 is mounted on the stile 52 of the window 50 and the sensor 20 is mounted on the side jamb 54 of the window 50 near the sill 56 thereof. This allows the sensor 20 to be wired in the second configuration of the security alarm system. The window 50 is fully closed in FIG. 5 with the bottom rail 58 of the window 50 abutting the sill 56 thereof. The sensor 20 is able to read the RFID tag 10 when the window 50 is fully closed and signals that the window 50 is closed. Likewise, as shown in FIG. 6, the sensor 20 is also able to read the RFID tag 10 when the window 50 is open up to a threshold distance D1. It is desirable to allow the window 50 to be partially opened for ventilation but not opened enough to allow an intruder to enter through the window 50. The sensor 20 will accordingly not trigger an alarm when the sensor 20 is able to read the RFID tag 10. However, and with reference to FIG. 7, when the window 50 is open to a distance D2, which is greater than the threshold distance D1, the sensor 20 is no longer able to read the RFID tag 10 and an alarm is triggered.

Figure 9:
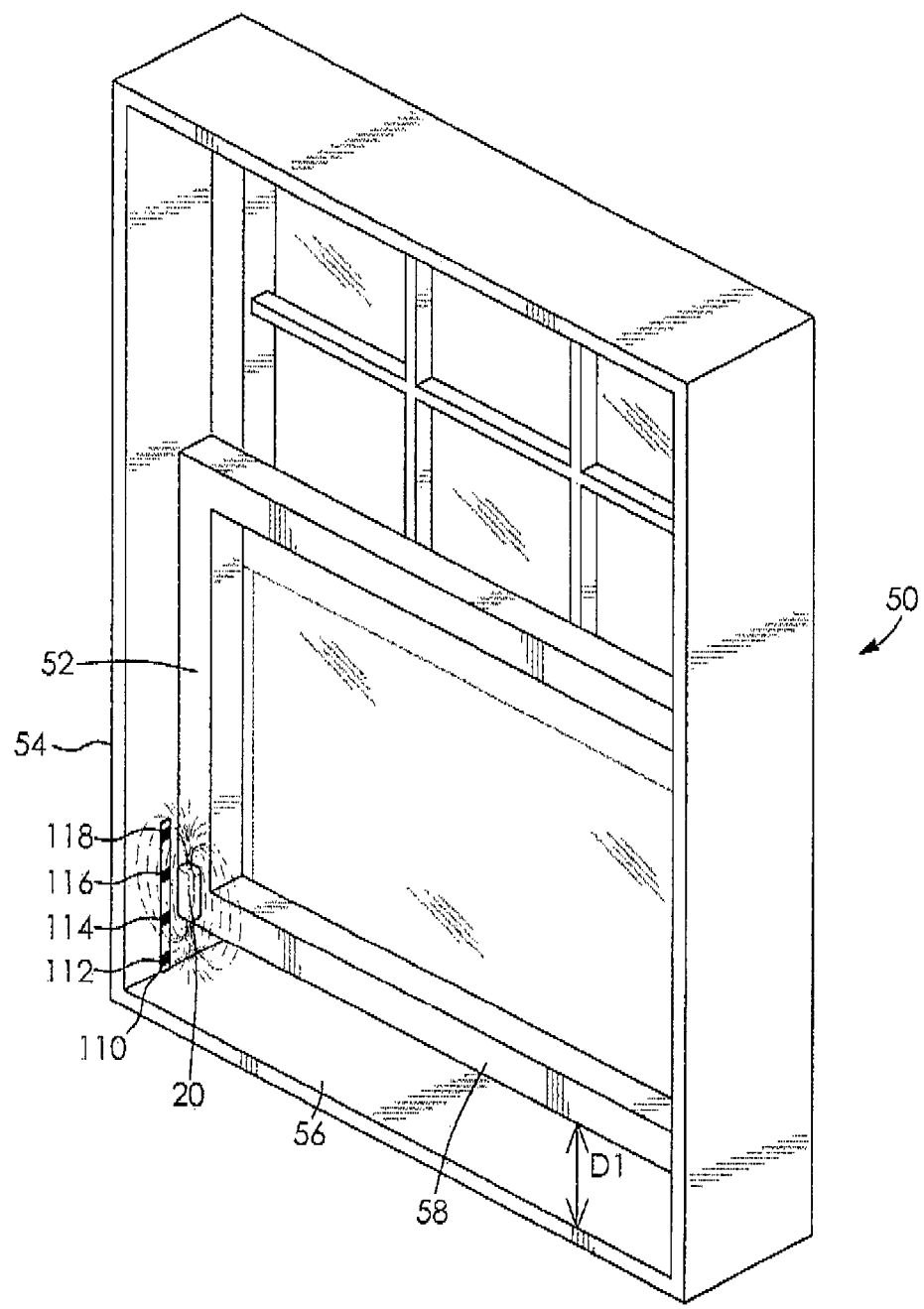
FIG. 9 is a perspective view showing the RFID strip and the sensor being used as the window sensor in the third configuration of the security alarm system with the window being open a distance of D1.
Figure 10:
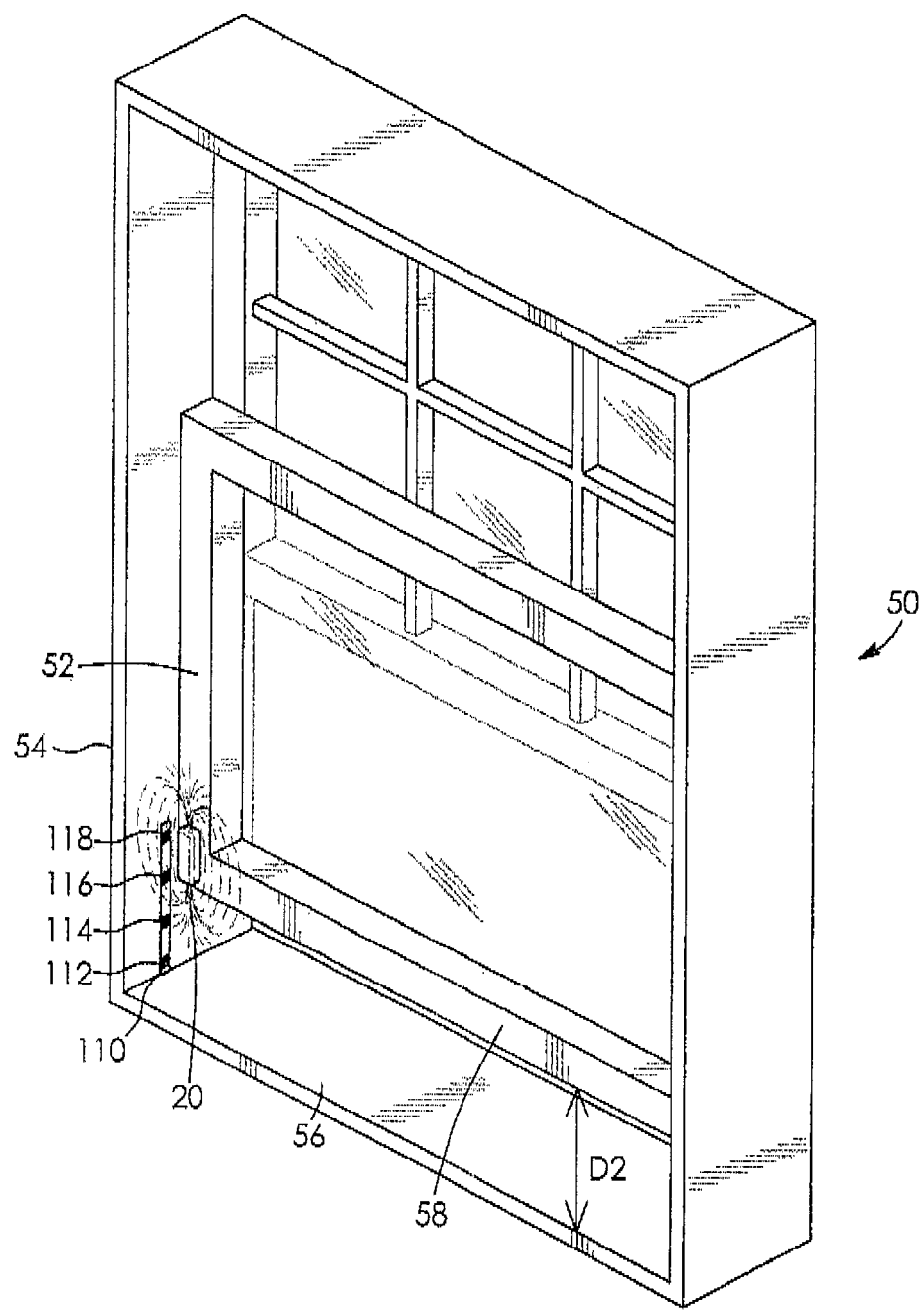
FIG. 10 is a perspective view showing the RFID strip and the sensor being used the window sensor in the third configuration of the security alarm system with the window being open a distance of D2.
Figure 11:
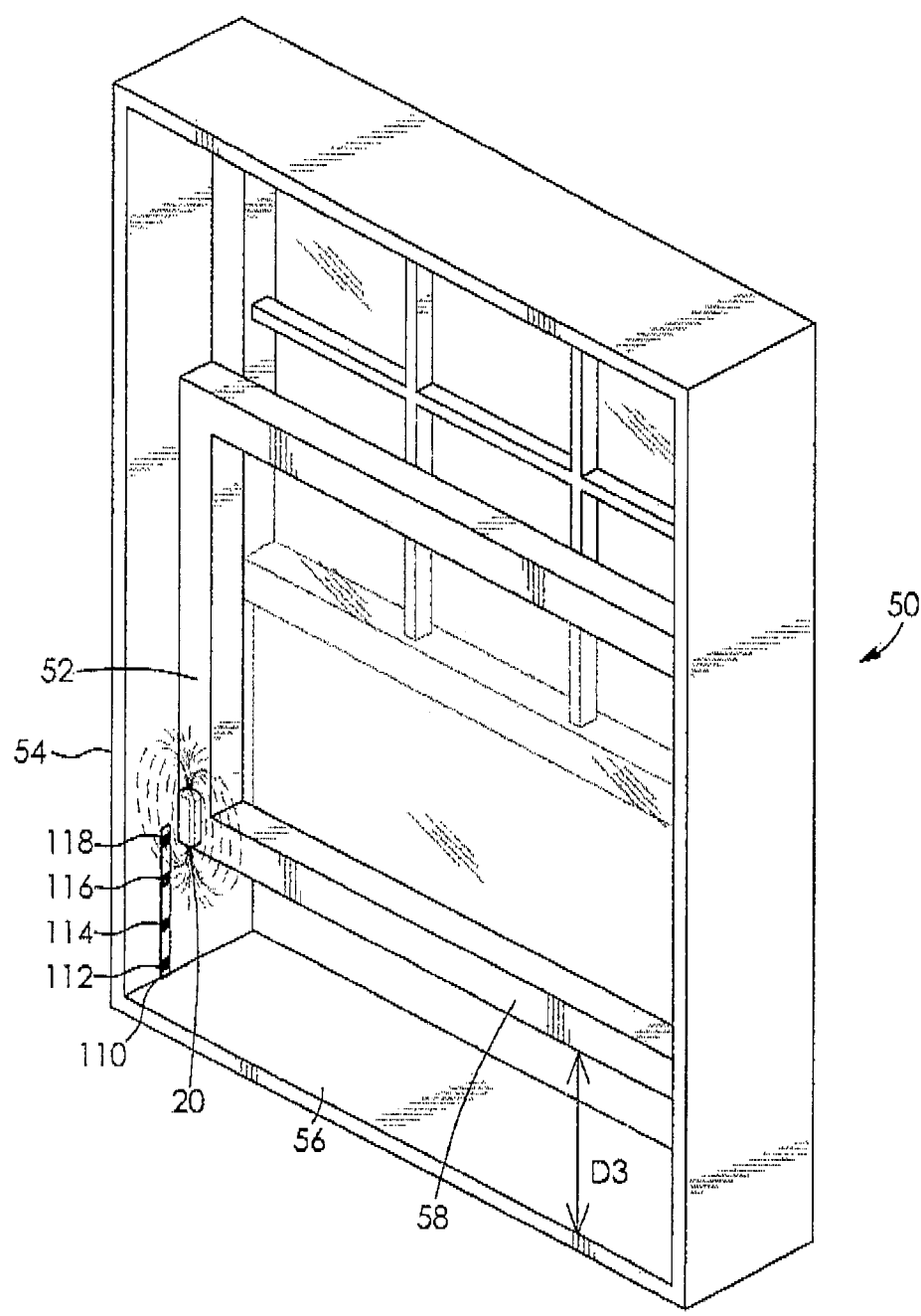
FIG. 11 is a perspective view showing the RFID strip and the sensor being used as the window sensor in the third configuration of the security alarm system with the window being open a distance of D3.
Figure 12:
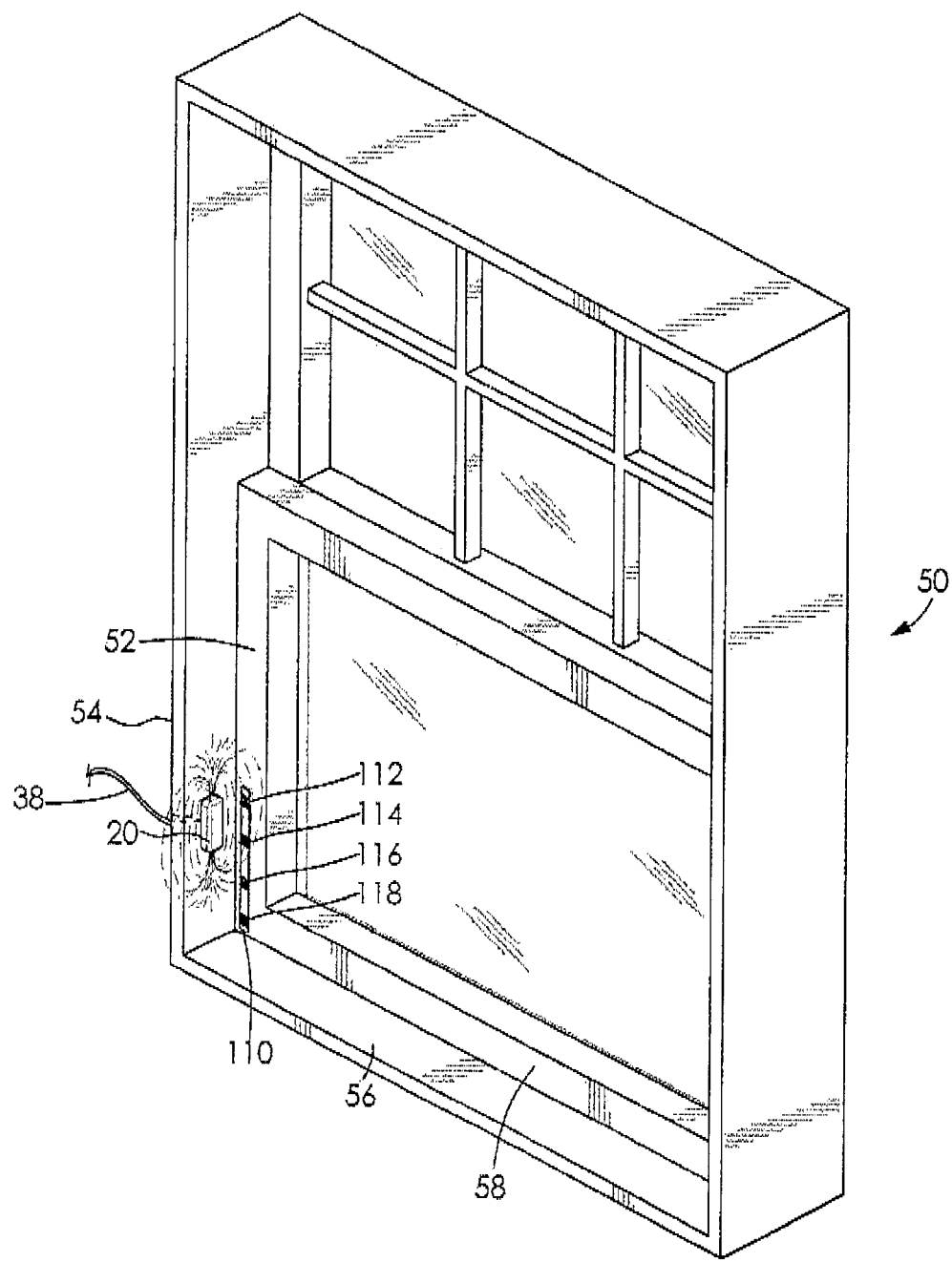
FIG. 12 is a perspective view showing the RFID strip and the sensor being used as a window sensor in a fourth configuration of a security alarm system with the window closed.

FIGS. 8 to 11 show a substrate strip 110 with a plurality of RFID tags, namely a first REID tag 112, a second RFID tag 114, a third RFID tag 116, and a fourth RFID tag 118. The substrate strip 110 and the sensor 20 are used as a window sensor for a window 50 in a third configuration of a security alarm system. The third configuration of the security alarm system is a wireless security alarm system in which the sensor 20 is mounted on the stile 52 of the window 50 and the substrate strip 110 is mounted on the side jamb 54 of the window 50 near the sill 56 thereof. The window 50 is fully closed in FIG. 8 with the bottom rail 58 of the window 50 abutting the sill 56 thereof. The sensor 20 is able to read the first RFID tag 112 when the window 50 is fully closed and signals that the window 50 is closed. However, as shown in FIG. 9, the sensor 20 is no longer able to read the first RFID tag 112 when the window 50 is open to a threshold distance D1. The sensor 20 is able though to read the second RFID tag 114 when the window 50 is open to the threshold distance D1 and signals that the window 50 is open to the threshold distance D1. It is desirable to allow the window 50 to be partially opened for ventilation but not opened enough to allow an intruder to enter through the window 50. The sensor 20 will accordingly not trigger an alarm as the sensor 20 is able to read the second RED tag 114 and determine that the window 50 is open up to the threshold distance D1. Referring now to FIGS. 10 and 11, when the window 50 is open to a distance D2 or distance D3, which is greater than the threshold distance D1, the sensor 20 is no longer able to read the second RFID tag 114 and the sensor will trigger an alarm as the distance D2 or distance D3 is greater than the threshold distance D1. The sensor 20 is able to read the third RFID tag 116 when the window 50 is open to the distance D2, as shown in FIG. 10, and signals that the window 50 is open to the distance D2. Likewise, as shown in FIG. 11, the sensor 20 is able to read the fourth RFID tag 118 when the window 50 is open to the distance D3 signals that the window 50 is open to the distance D3. The third embodiment of the security alarm system is thereby able to determine how much the window 50 is open based on whether the sensor is able to read the third RFID tag 116, the fourth RFID tag 118, or both.

Figure 13:
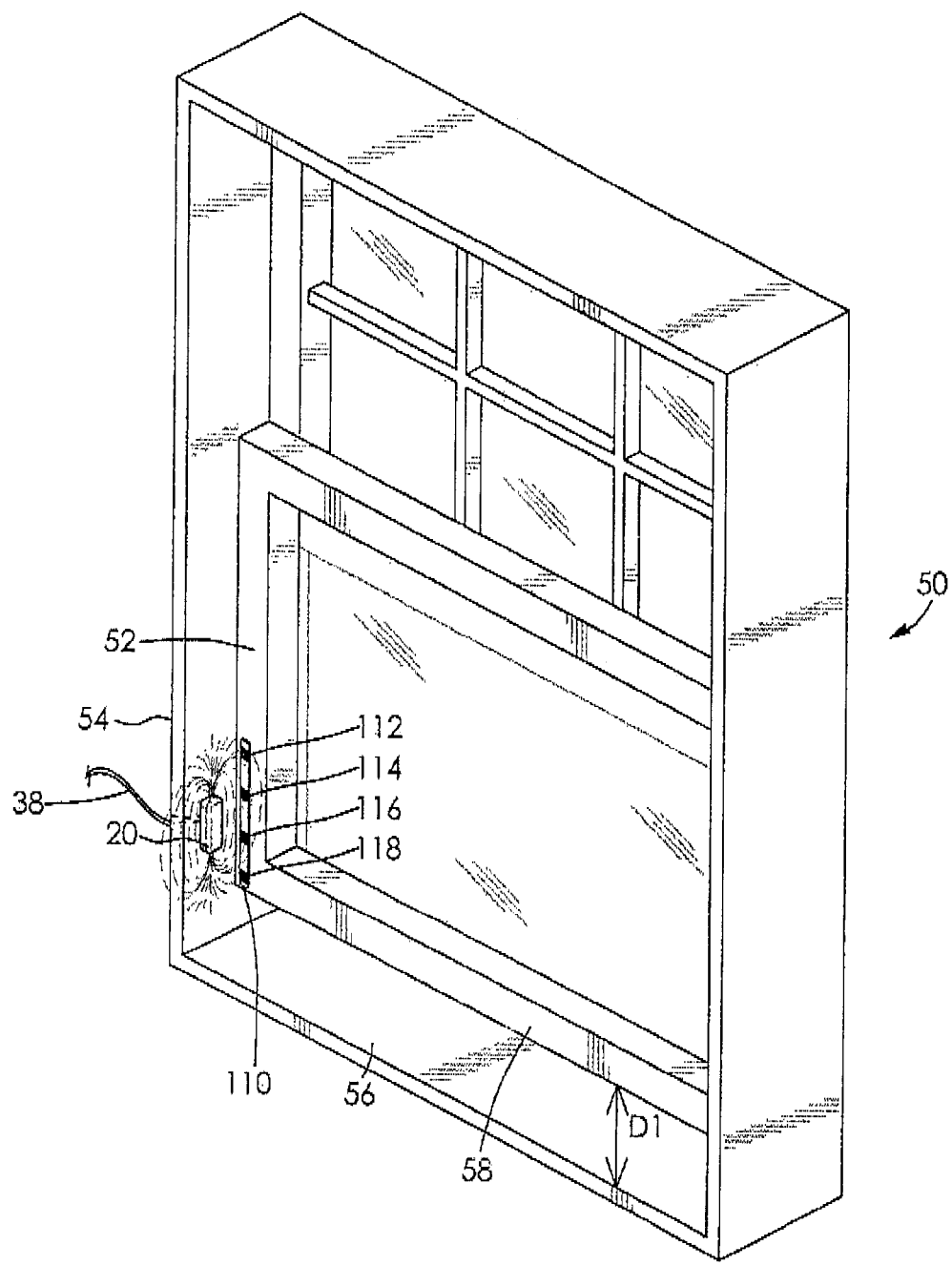
FIG. 13 is a perspective view showing the RFID strip and the sensor being used as the window sensor in the fourth configuration of the security alarm system with the window being open a distance of D1.
Figure 14:
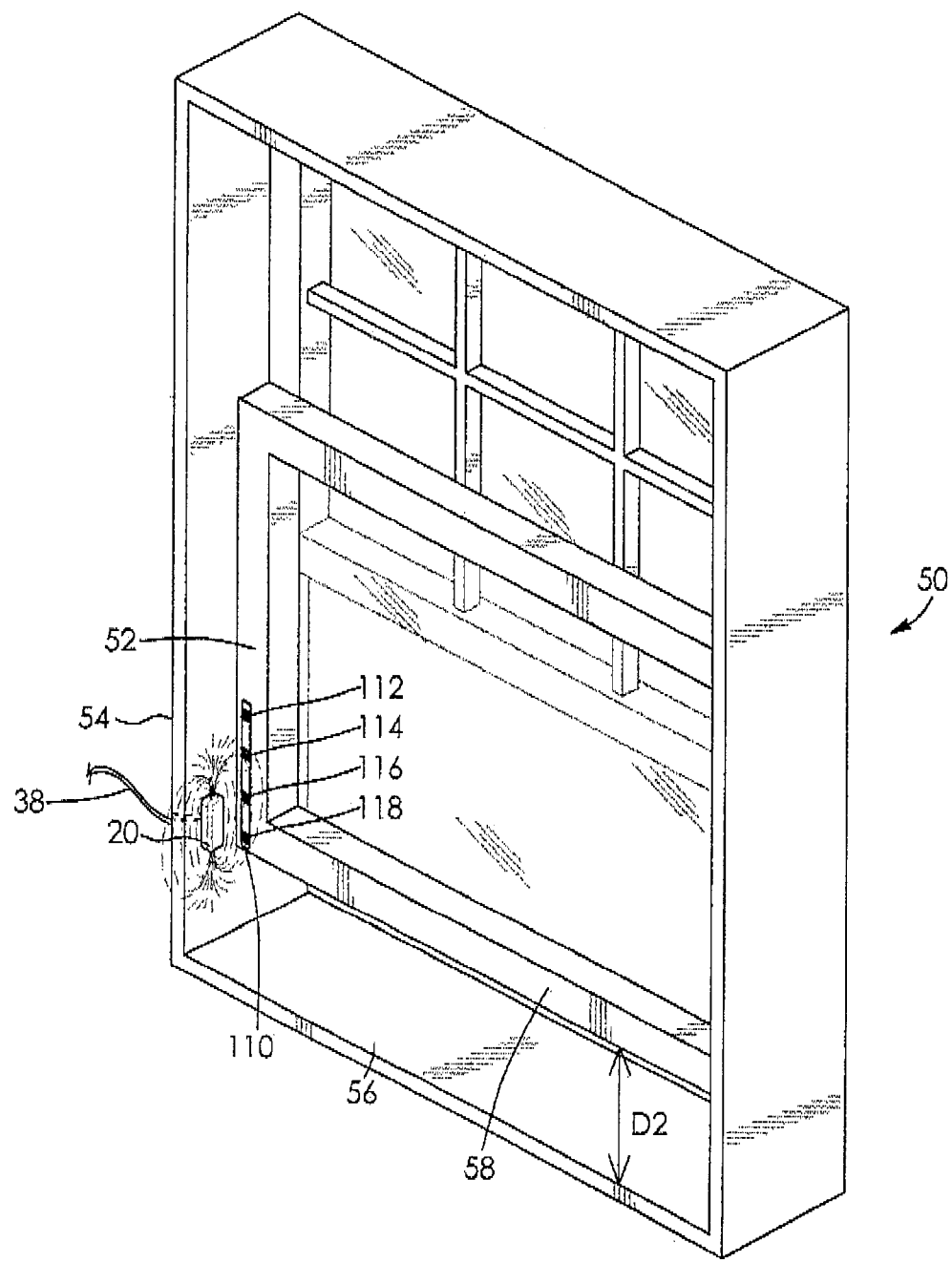
FIG. 14 is a perspective view showing the RFID strip and the sensor being used as the window sensor in the fourth configuration of the security alarm system with the window being open a distance of D2.
Figure 15:
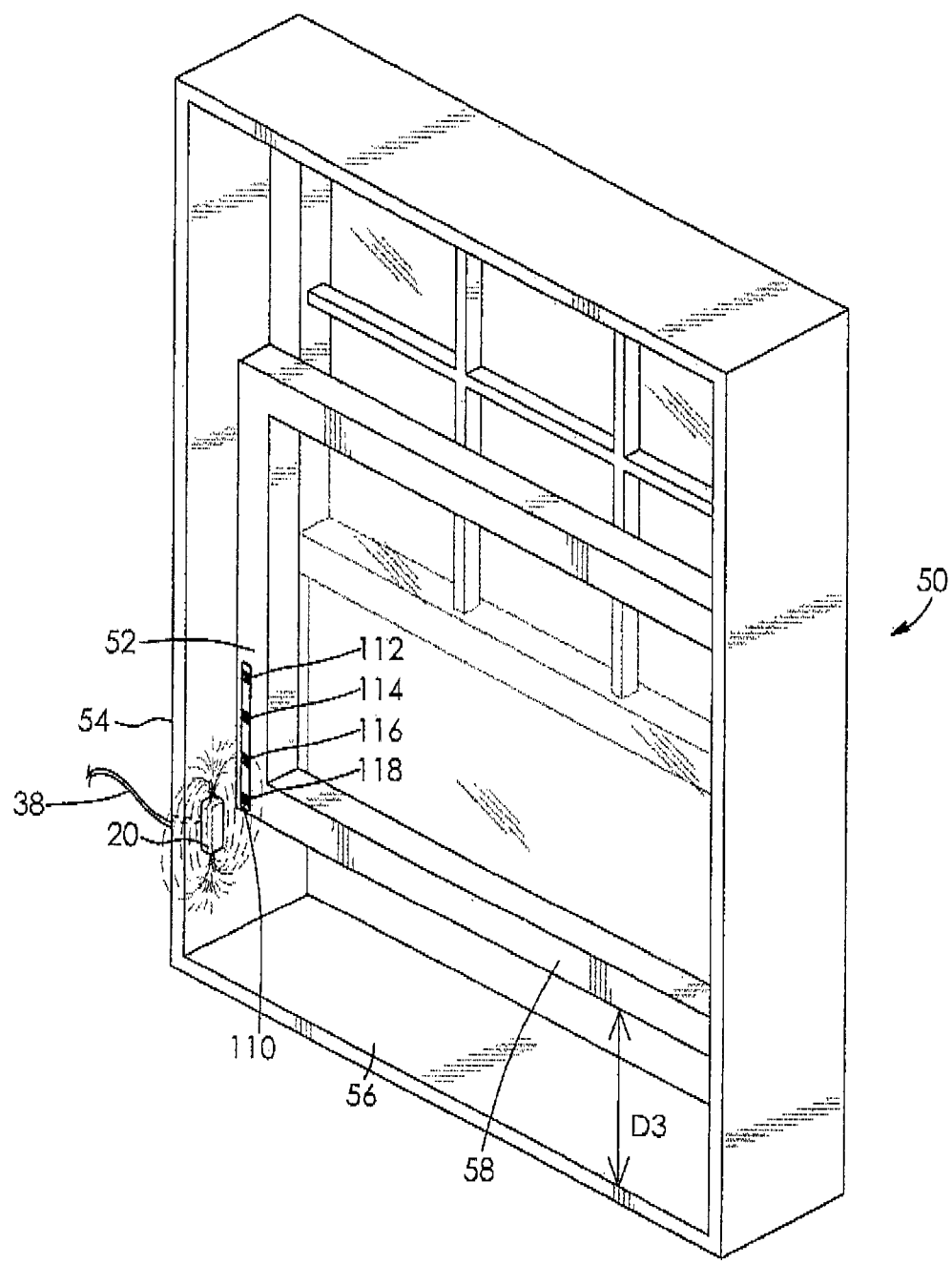
FIG. 15 is a perspective view showing the RFID strip and sensor being used as the window sensor in the fourth configuration of the security alarm system with the window being open a distance of D3.

FIGS. 12 to 15 show the substrate strip 110 and the sensor 20 being used as a window sensor for a window 50 in a fourth configuration of a security alarm system. The fourth configuration of the security alarm system is a wired security alarm system in which the substrate strip 110 is mounted on the stile 52 of the window 50 and the sensor 20 is mounted on the side jamb 54 of the window 50 near the sill 56 thereof. This allows the sensor 20 to be wired in the fourth configuration of the security alarm system. The window 50 is fully closed in FIG. 12 with the bottom rail 58 of the window 50 abutting the sill 56 thereof. The sensor 20 is able to read the first RFID tag 112 when the window 50 is fully closed and signals that the window 50 is closed. However, as show in FIG. 13, the sensor 20 is also no longer able to read the first RFID tag 112 when the window 50 is open to a threshold distance D1. The sensor 20 is able though to read the second RFID tag 114 when the window 50 is open to the threshold distance D1 and signals that the window 50 is open to the threshold distance D1. It is desirable to allow the window 50 to be partially opened for ventilation but not opened enough to allow an intruder to enter through the window 50. The sensor 20 will accordingly not trigger an alarm as the sensor 20 is able to read the second RFID tag 114 and determine that the window 50 is open up to the threshold distance D1. Referring now to FIGS. 14 and 15, when the window 50 is open to a distance D2 or a distance D3, which is greater than the threshold distance D1, the sensor 20 is no longer able to read the second RFID tag 114 and the sensor will trigger an alarm as the distance D2 is greater than the threshold distance D1. The sensor 20 is able to read the third RFID tag 116 when the window 50 is open to the distance D2, as shown in FIG. 14, and signals that the window 50 is open to the distance D2. Likewise, as shown in FIG. 15, the sensor 20 is able to read the fourth RFID tag 118 when the window 50 is open to the distance D3 signals that the window 50 is open to the distance D3. The fourth embodiment of the security alarm system is thereby able to determine how much the window 50 is open based on whether the sensor is able to read the third RFID tag 116, the fourth RFID tag 118, or both.

Figure 16:
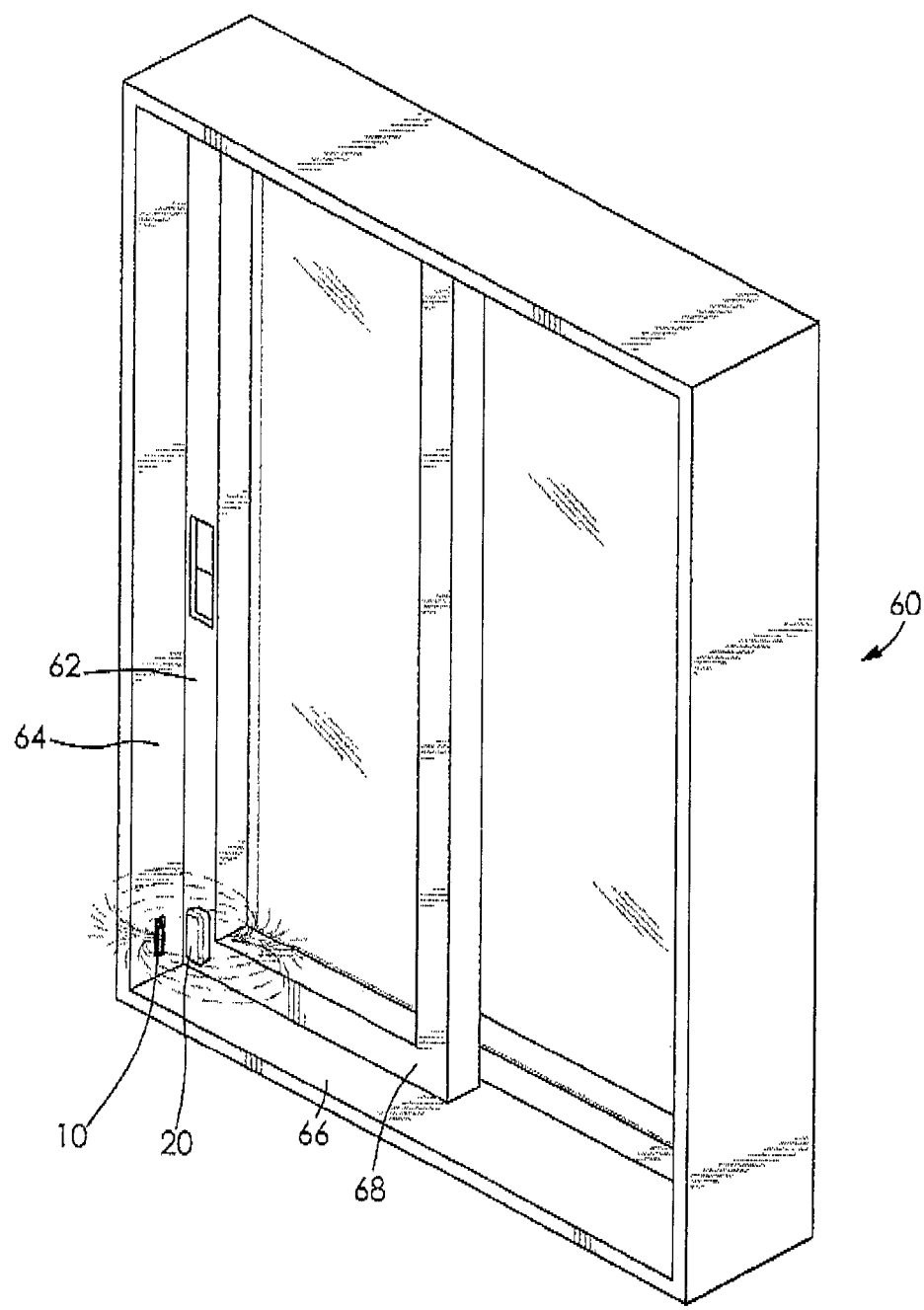
FIG. 16 is a perspective view showing the RFID tag and the sensor being used as a door sensor in a fifth configuration of a security alarm system with the door closed.
Figure 17:
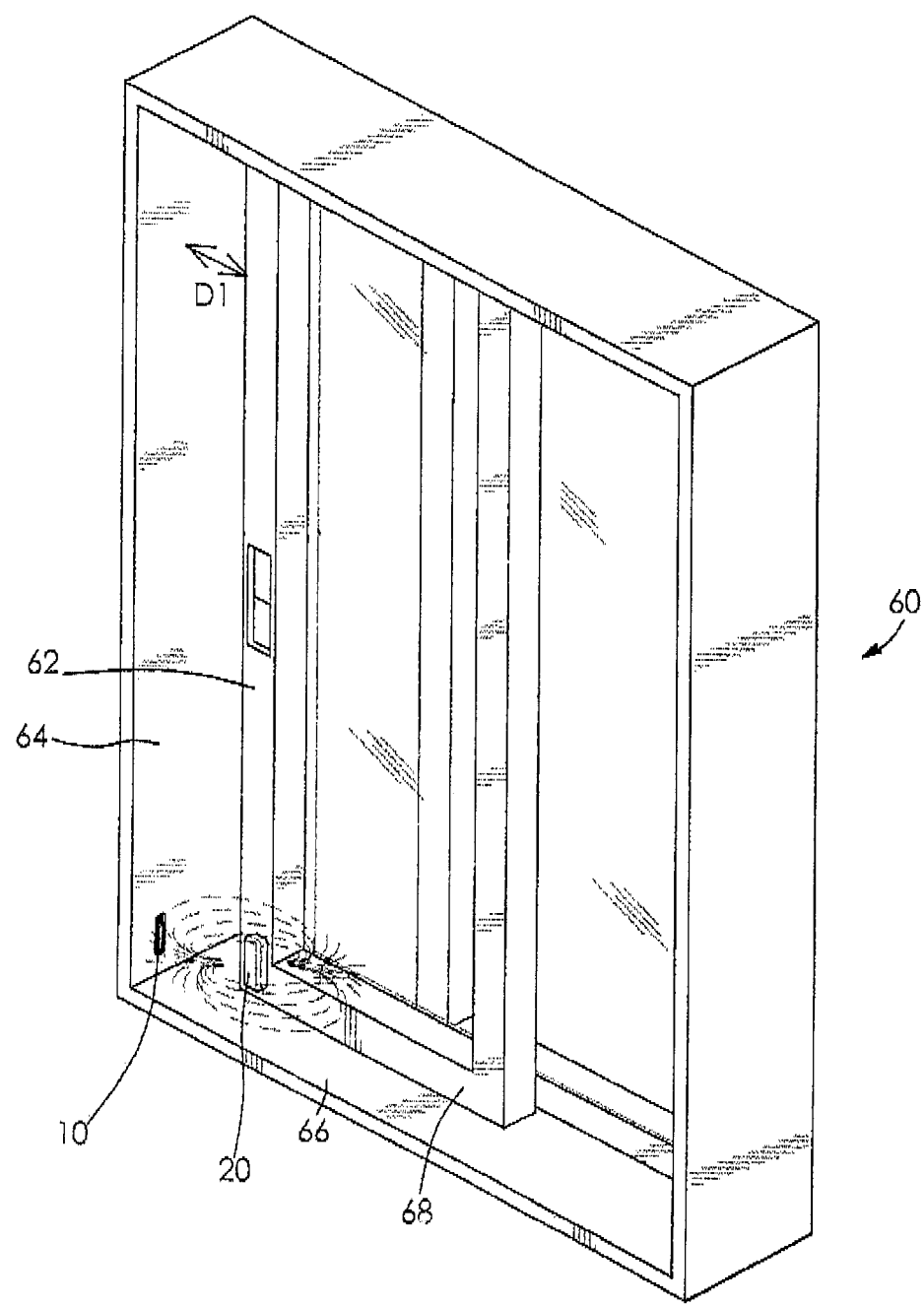
FIG. 17 is a perspective view showing the RFID tag and the sensor being used as the door sensor in the fifth configuration of the security alarm system with the door being open a distance of D1.
Figure 18:
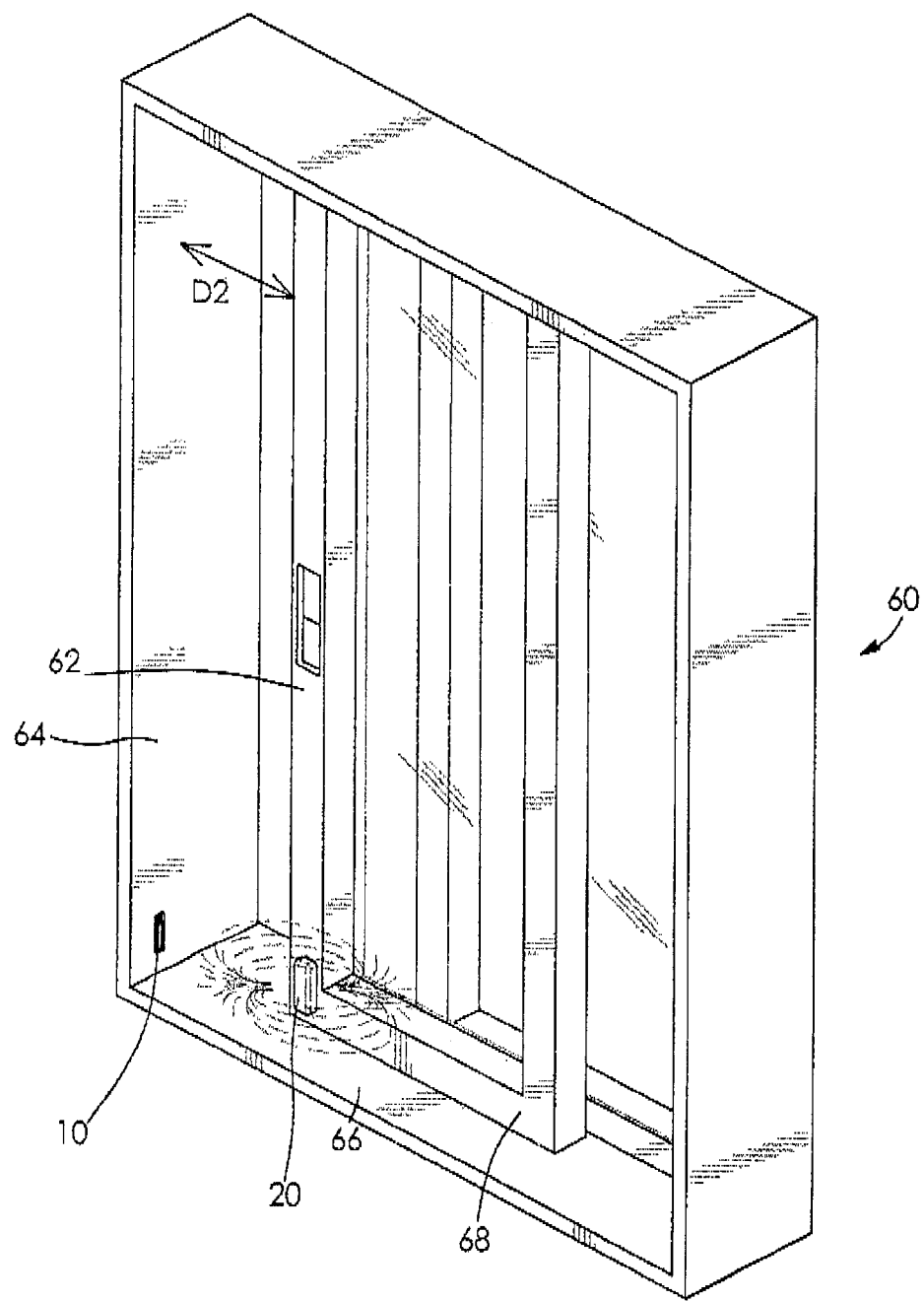
FIG. 18 is a perspective view showing the RFID tag and the sensor being used as the door sensor in the fifth configuration of the security alarm system with the door being open a distance of D2.

FIGS. 16 to 18 show the RFID tag 10 and the sensor 20 being used as a door sensor for a door 60 in a fifth configuration of a security alarm system. The fifth configuration of the security alarm system is a wireless security alarm system in which the sensor 20 is mounted on a stile 62 of the door 60 and the RFID tag 10 is mounted on a side jamb 64 of the door 60 near a sill 66 thereof. The door 60 is fully closed in FIG. 16 with the stile 62 of the door 60 abutting the side jamb 64 thereof. The sensor 20 is able to read the RFID tag 10 when the door 60 is fully closed and signals that the door 60 is closed. Likewise, as shown in FIG. 17, the sensor 20 is also able to read the RFID tag 10 when the door 60 is open up to a threshold distance D1. It is desirable to allow the door 60 to be partially opened for ventilation but not opened enough to allow an intruder to enter through the door 60. The sensor 20 will accordingly not trigger an alarm when the sensor 20 is able to read the RFID tag 10. However, and with reference to FIG. 18, when the door 60 is open to a distance D2, which is greater than the threshold distance D1, the sensor 20 is no longer able to read the RFID tag 10 and an alarm is triggered. The sensor 20 may be mounted to a bottom rail 68 of the door 60 in other configurations.

Figure 19:
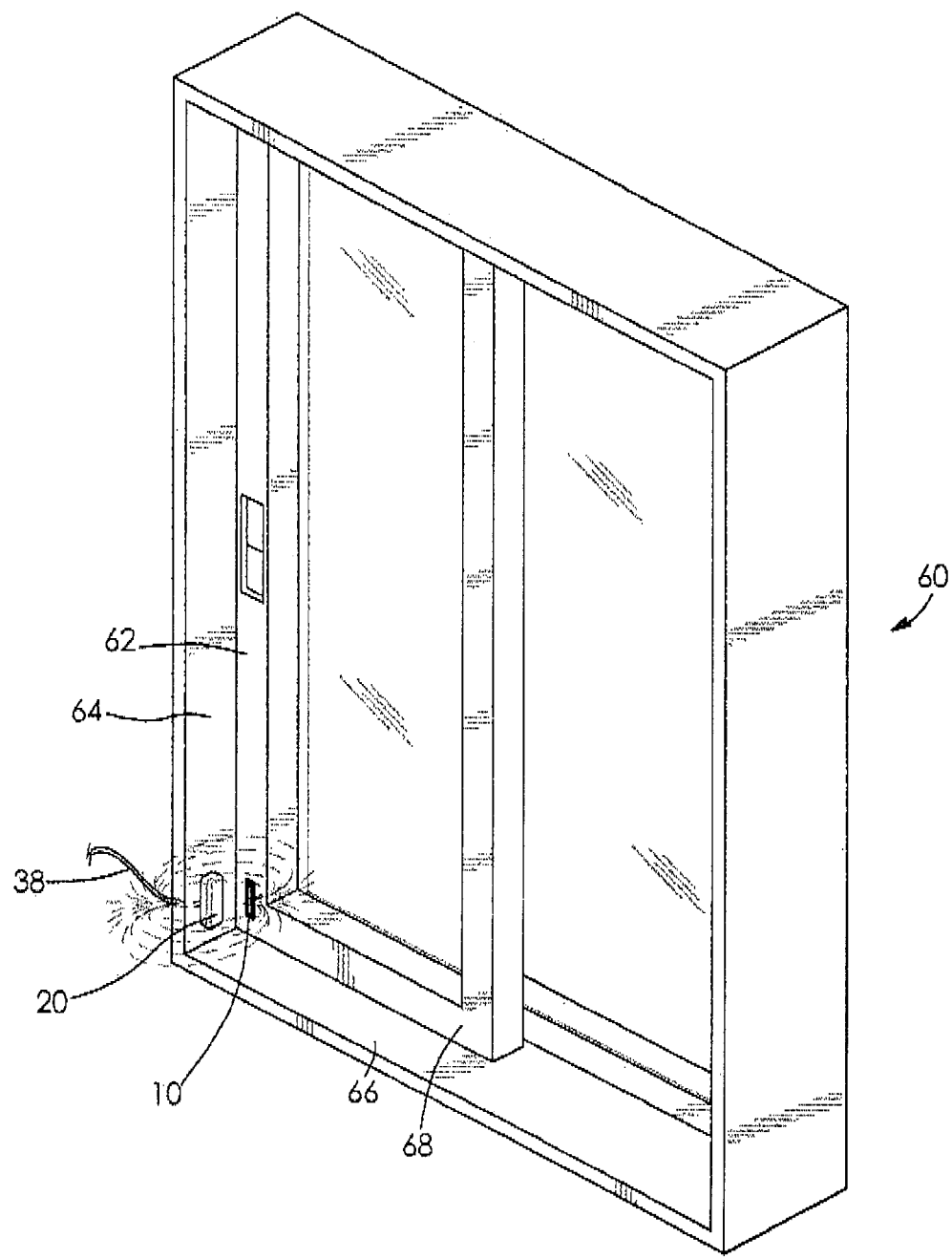
FIG. 19 is a perspective view showing the RFID tag and the sensor being used as the door sensor in a sixth configuration of a security alarm system with the door closed.
Figure 20:
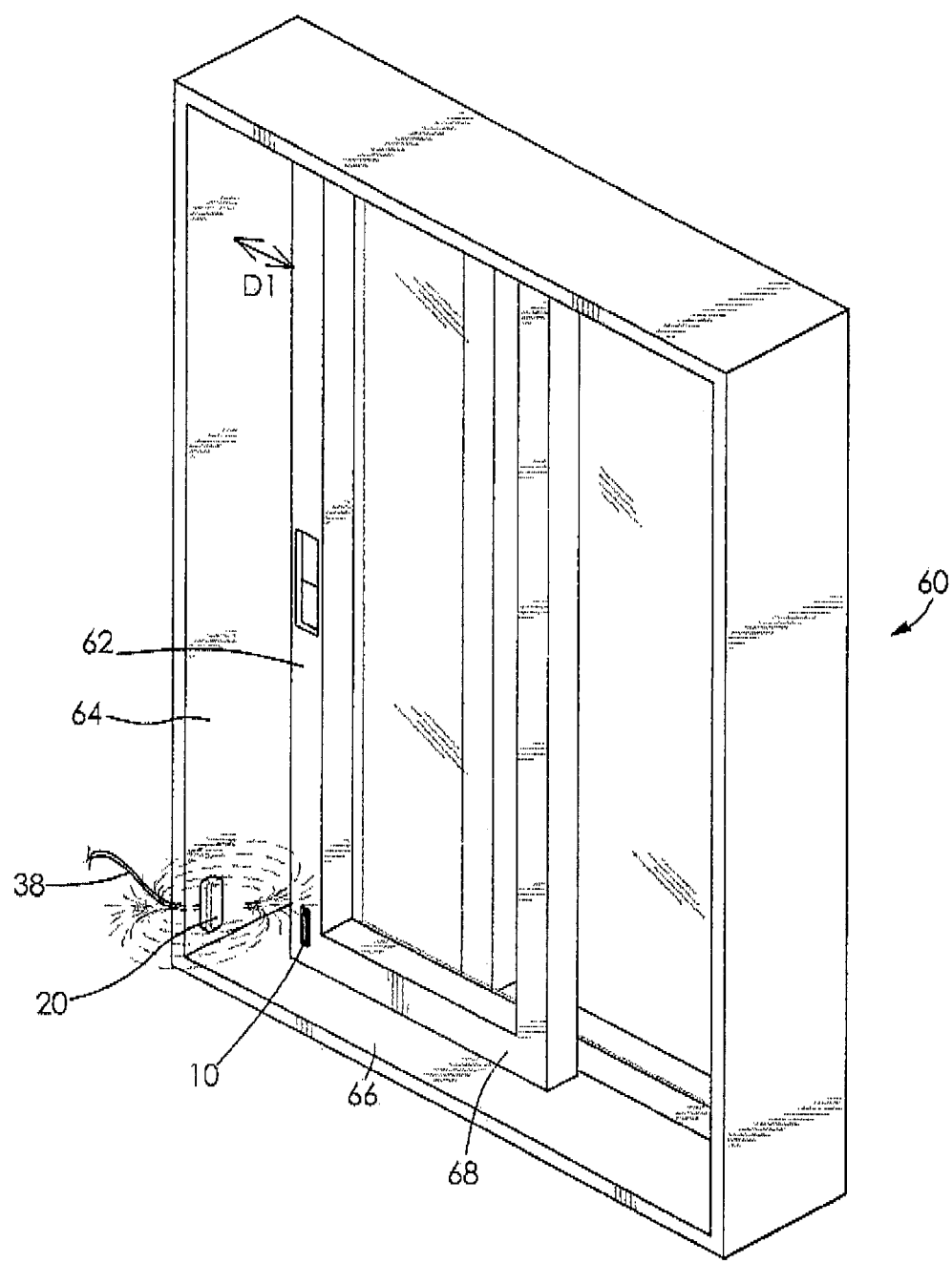
FIG. 20 is a perspective view showing the RFID tag and the sensor being used as the door sensor in the sixth configuration of the security alarm system with the door being open a distance of D1.
Figure 21:
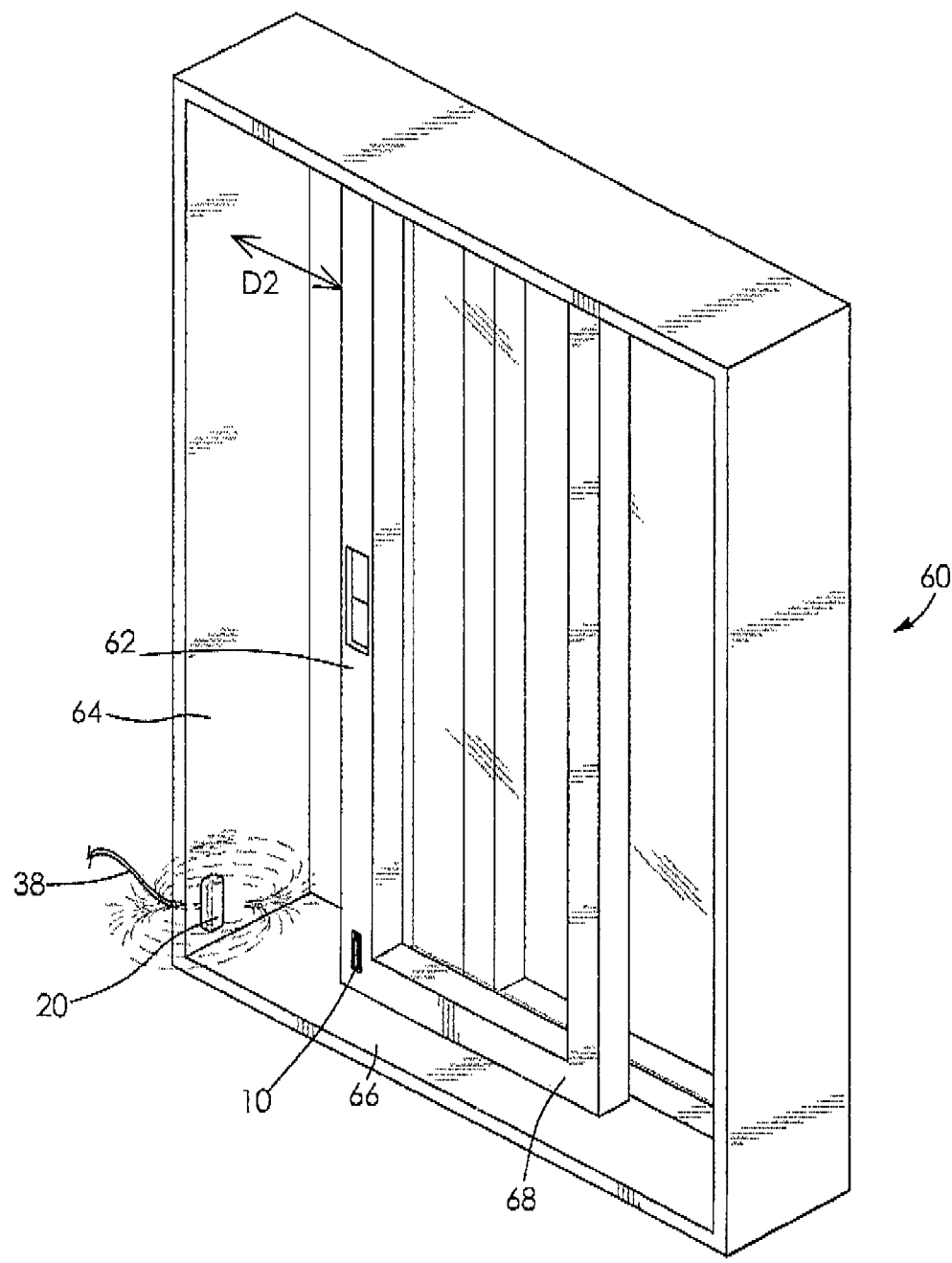
FIG. 21 is a perspective view showing the RFID tag and the sensor being used as the door sensor in the sixth configuration of the security alarm system with the door being open a distance of D2.
Figure 22:
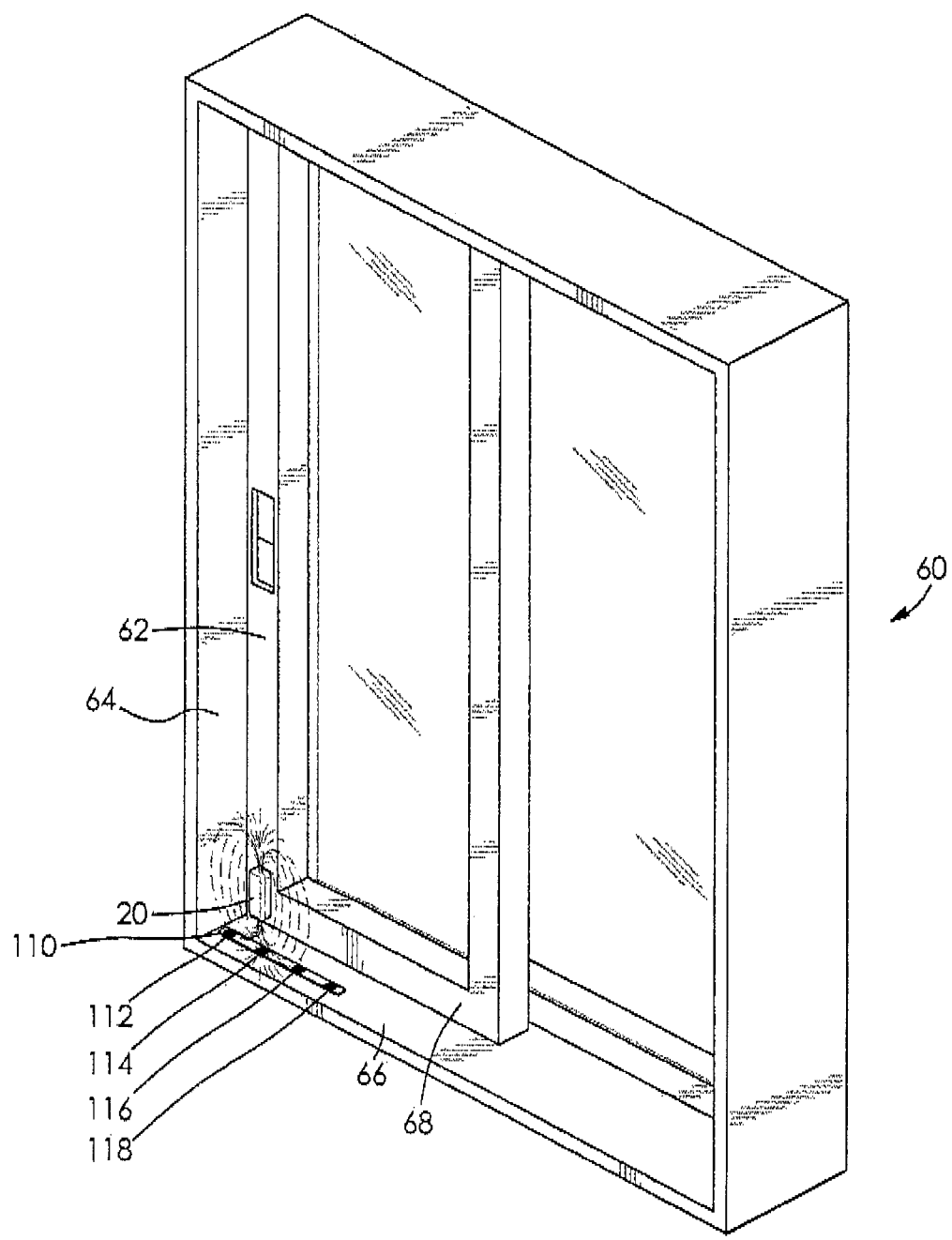
FIG. 22 is a perspective view showing the RFID strip and the sensor being used as a door sensor in a seventh configuration of a security alarm system with the door closed.

FIGS. 19 to 21 show the RFID tag 10 and the sensor 20 being used as a door sensor for a door 60 in a sixth configuration of a security alarm system. The sixth configuration of the security alarm system is a wired security alarm system in which the RFID tag 10 is mounted on the stile 62 of the door 60 and the sensor 20 is mounted on the side jamb 64 of the door 60 near the sill 66 thereof. This allows the sensor 20 to be wired in the sixth configuration of the security alarm system. The door 60 is fully closed in FIG. 19 with the stile 62 of the door 60 abutting the side jamb 64 thereof. The sensor 20 is able to read the RFID tag 10 when the door 60 is fully closed and signals that the door 60 is closed. Likewise, as shown in FIG. 20, the sensor 20 is also able to read the RFID tag 10 when the door 60 is open up to a threshold distance D1. It is desirable to allow the door 60 to be partially opened for ventilation but not opened enough to allow an intruder to enter through the door 60. The sensor 20 will accordingly not trigger an alarm when the sensor 20 is able to read the RFID tag 10. However, and with reference to FIG. 21, when the door 60 is open to a distance D2, which is greater than the threshold distance D1, the door 60 is no longer able to read the RFID tag 10 and an alarm is triggered.

Figure 23:
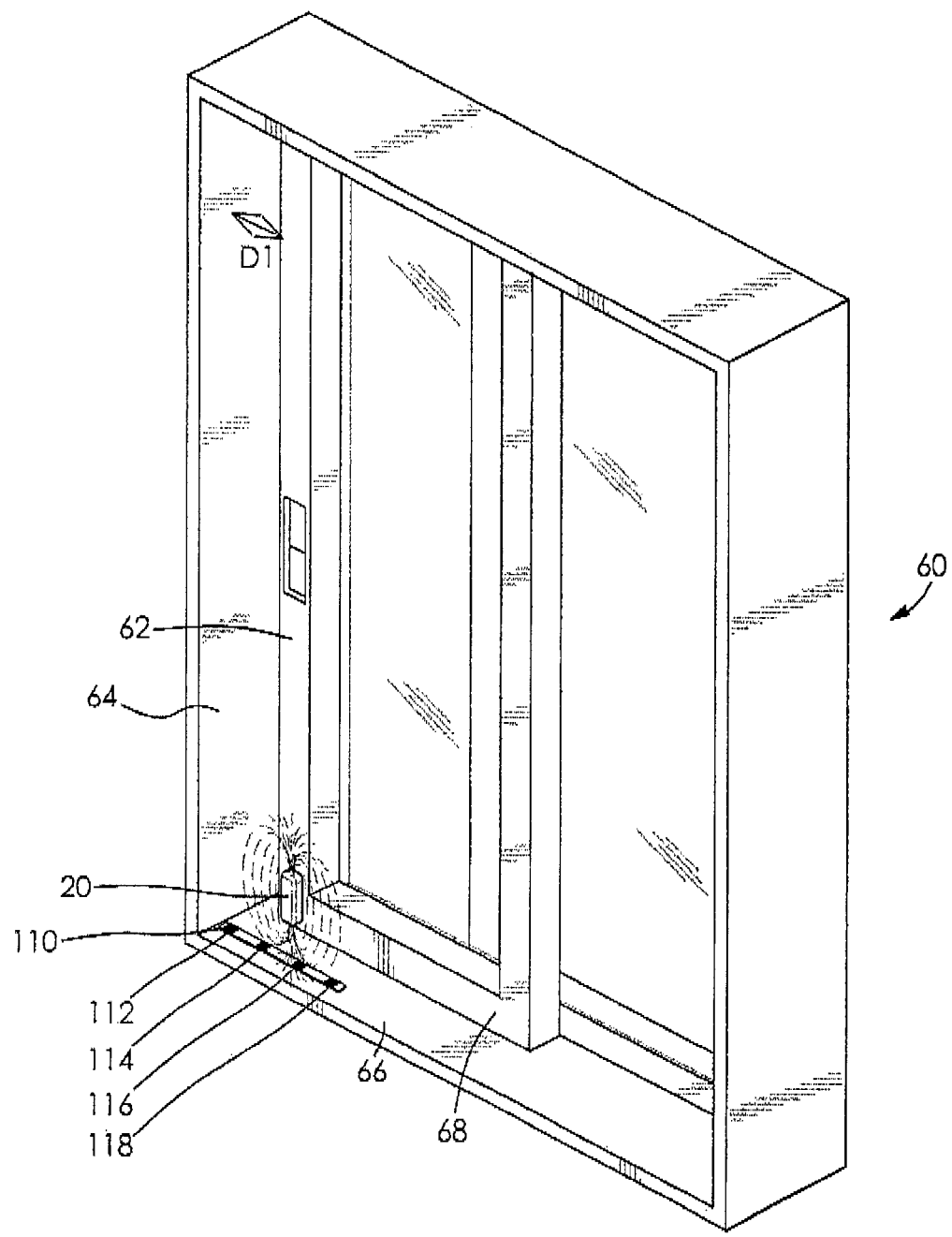
FIG. 23 is a perspective view showing the RFID strip and the sensor being used as the door sensor in the seventh configuration of the security alarm system with the door being open a distance of D1.
Figure 24:
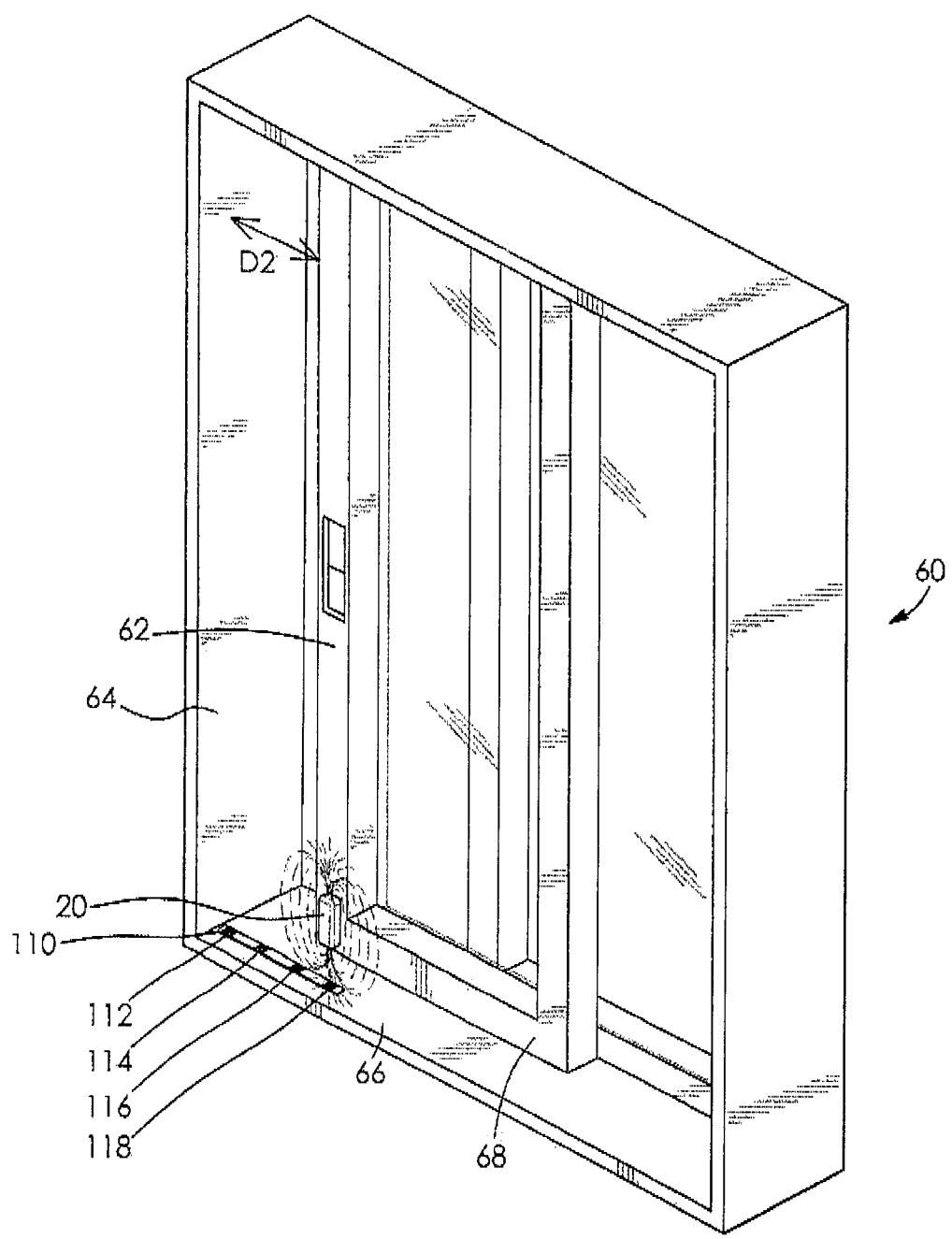
FIG. 24 is a perspective view showing the RFID strip and the sensor being used as the door sensor in the seventh configuration of the security alarm system with the door being open a distance of D2.
Figure 25:
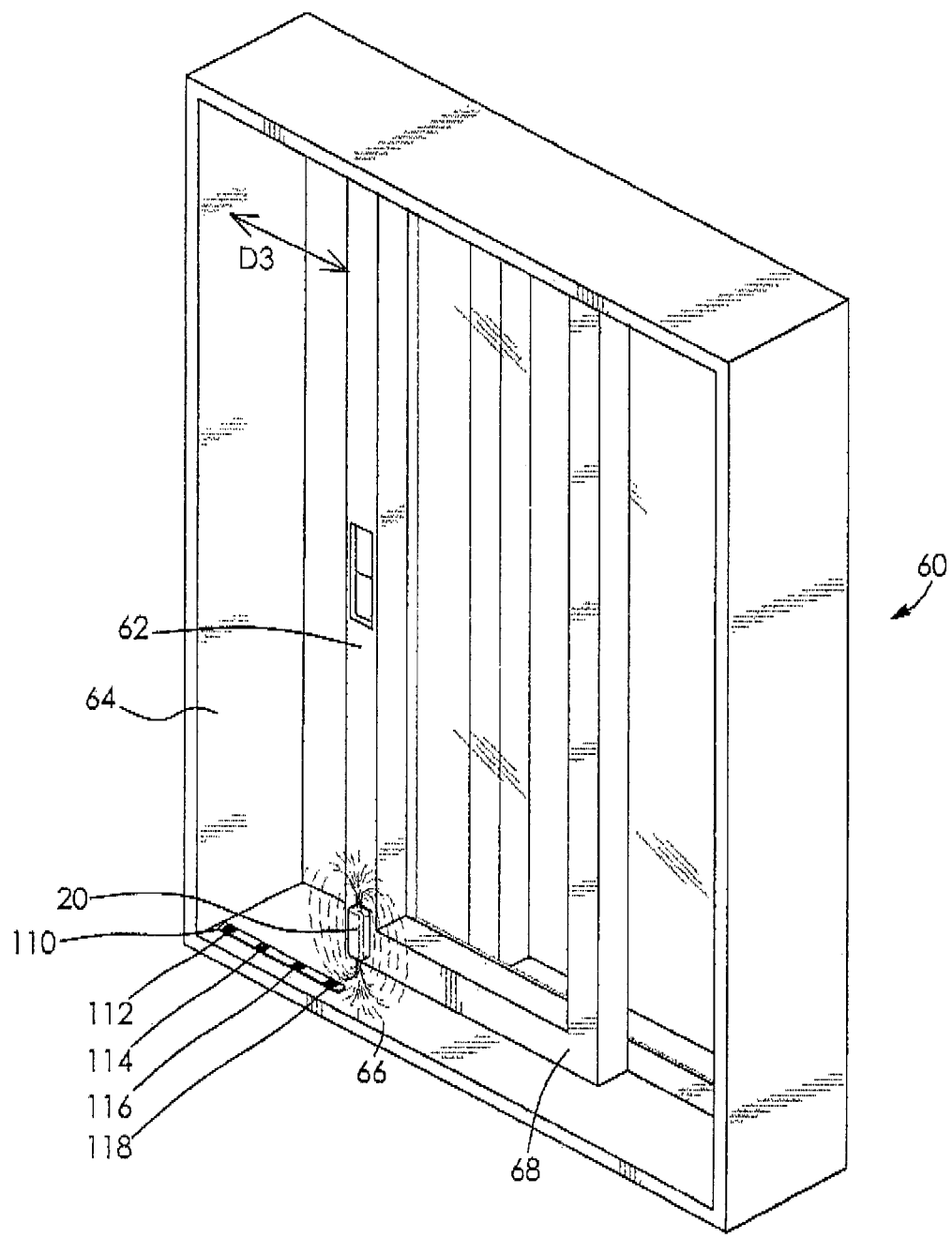
FIG. 25 is a perspective view showing the RFID strip and the sensor being used as the door sensor in the seventh configuration of the security alarm system with the door being open a distance of D3.
Figure 26:
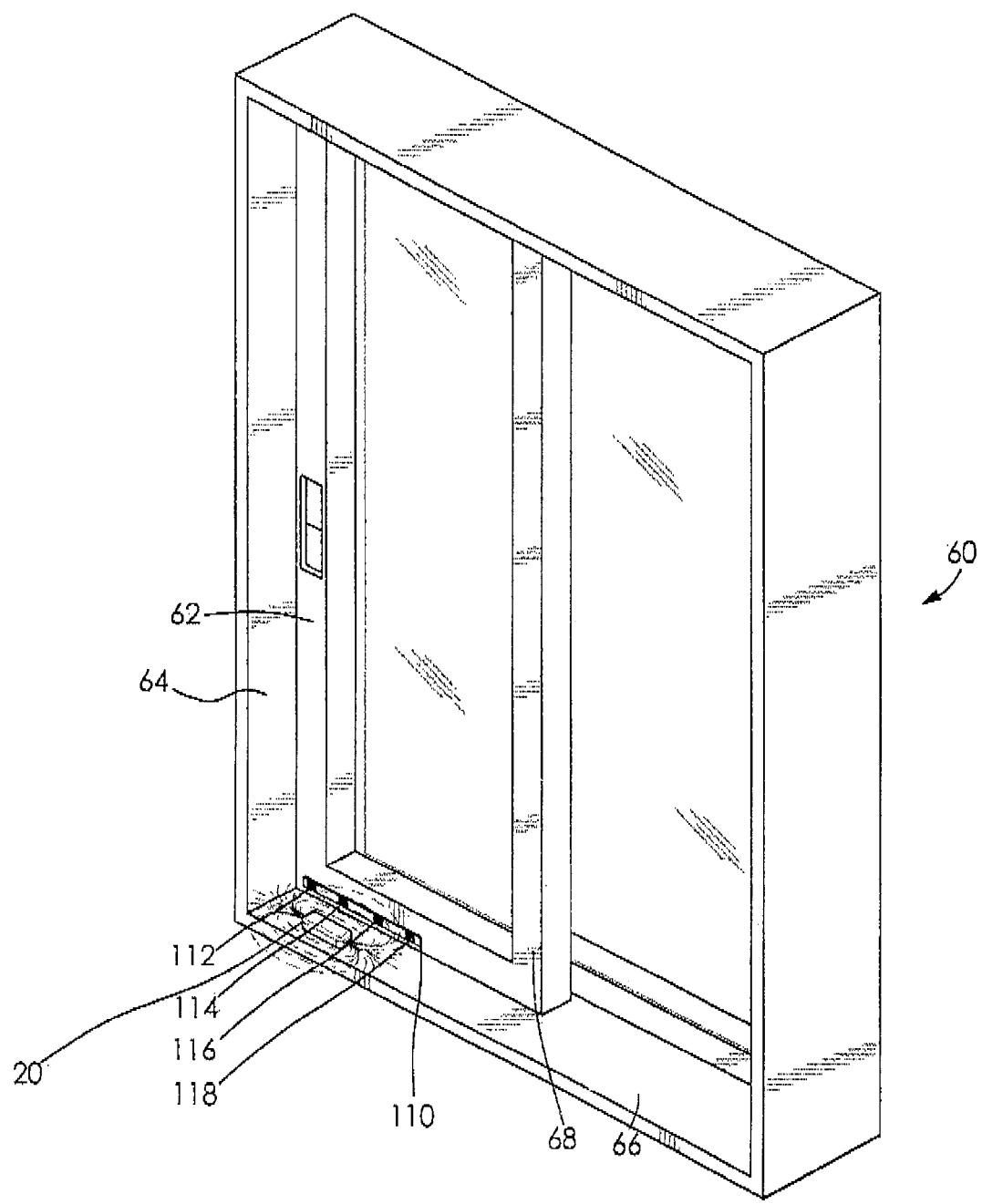
FIG. 26 is a perspective view showing the RFID strip and the sensor being used as a door sensor in an eighth configuration of a security alarm system with the door closed.
Figure 27:
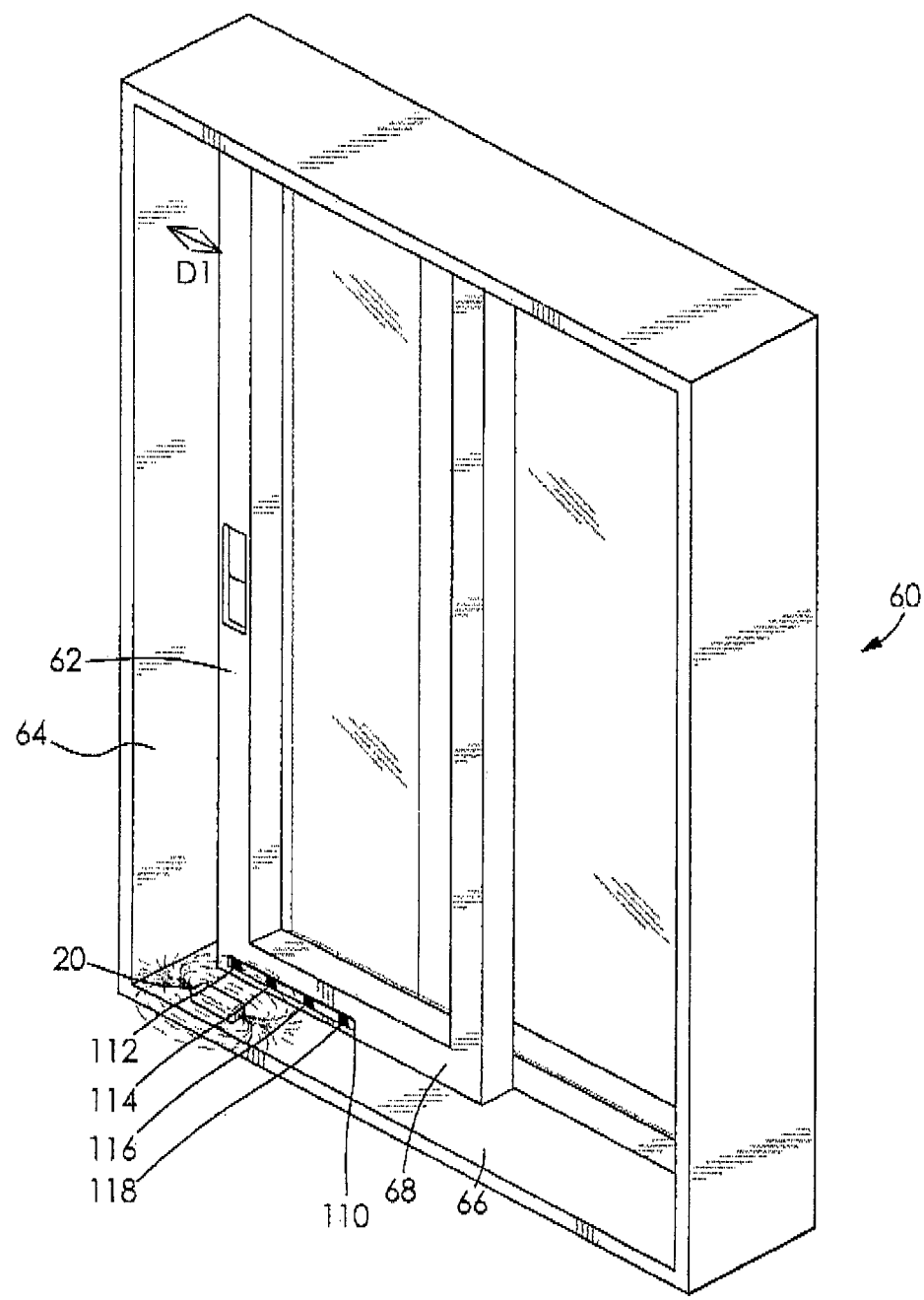
FIG. 27 is a perspective view showing the RFID strip and the sensor being used as the door sensor in the eighth configuration of the security alarm system with the door being open a distance of D1.

FIGS. 22 to 25 show the substrate strip 110 and the sensor 20 being used as a door sensor for a door 60 in a seventh configuration of a security alarm system. The seventh configuration of the security alarm system is a wireless security alarm system in which the sensor 20 is mounted on the stile 62 of the door 60 and the substrate strip 110 is mounted on the sill 66 of the door. The door 60 is fully closed in FIG. 22 with the stile 62 of the door 60 abutting the side jamb 64 thereof. The sensor 20 is able to read the first RFID tag 112 when the door 60 is fully closed and signals that the door 60 is closed. However, as shown in FIG. 23, the sensor 20 is no longer able to read the first RFID tag 112 when the door 60 is open to a threshold distance D1. The sensor 20 is able though to read the second RFID tag 114 when the door 60 is open to the threshold distance D1 and signals that the door 60 is open to the threshold distance D1. It is desirable to allow the door 60 to be partially opened for ventilation but not opened enough to allow an intruder to enter through the door 60. The sensor 20 will accordingly not trigger an alarm as the sensor 20 is able to read the second RFD tag 114 and determine that the door 60 is open up to the threshold distance D1. Referring now to FIGS. 24 and 25, when the door 60 is open to a distance D2 or distance D3, which is greater than the threshold distance D1, the sensor 20 is no longer able to read the second RFID tag 114 and the sensor will trigger an alarm as the distance D2 or distance D3 is greater than the threshold distance D1. The sensor 20 is able to read the third RFID tag 116 when the door 60 is open to the distance D2, as shown in FIG. 24, and signals that the door 60 is open to the distance D2. Likewise, as shown in FIG. 25, the sensor 20 is able to read the fourth RFID tag 118 when the door 60 is open to the distance D3 signals that the door 60 is open to the distance D3. The seventh embodiment of the security alarm system is thereby able to determine how much the door 60 is open based on whether the sensor is able to read the third RFID tag 116, the fourth RFID tag 118, or both.

FIGS. 26 to 29 show the substrate strip 110 and the sensor 20 being used as a door sensor for a door 60 in an eighth configuration of a security alarm system. The eighth configuration of the security alarm system is a wired security alarm system in which the sensor 20 is mounted on the sill 66 of the door 60 and the substrate strip 110 is mounted on the bottom rail 68 the door 60 and. This allows the sensor 20 to be wired in the eighth configuration of the security alarm system. The door 60 is fully closed in FIG. 26 with the stile 62 of the door 60 abutting the side jamb 64 thereof. The sensor 20 is able to read the first RFID tag 112 when the door 60 is fully closed and signals that the door 60 is closed. However, as show in FIG. 27, the sensor 20 is also no longer able to read the first RFID tag 112 when the door 60 is open to a threshold distance D1. The sensor 20 is able though to read the second RFID tag 114 when the door 60 is open to the threshold distance D1 and signals that the door 60 is open to the threshold distance D1. It is desirable to allow the door 60 to be partially opened for ventilation but not opened enough to allow an intruder to enter through the door 60. The sensor 20 will accordingly not trigger an alarm as the sensor 20 is able to read the second RFID tag 114 and determine that the door 60 is open up to the threshold distance D1. Referring now to FIGS. 28 and 29, when the door 60 is open to a distance D2 or a distance D3, which is greater than the threshold distance D1, the sensor 20 is no longer able to read the second RFID tag 114 and the sensor will trigger an alarm as the distance D2 is greater than the threshold distance D1. The sensor 20 is able to read the third RFID tag 116 when the door 60 is open to the distance D2, as shown in FIG. 13, and signals that the door 60 is open to the distance D2. Likewise, as shown in FIG. 14, the sensor 20 is able to read the fourth RFID tag 118 when the door 60 is open to the distance D3 signals that the door 60 is open to the distance D3. The eighth embodiment of the security alarm system is thereby able to determine how much the door 60 is open based on whether the sensor is able to read the third RFID tag 116, the fourth RFID tag 118, or both.

It will be understood by a person skilled in the art that, although the embodiments of the security alarm system shown in FIGS. 8 to 15 and 22 to 29 employ a strip with a plurality of RFID tags, in other embodiments of the security alarm system an elongate RFID tag with a plurality of subsections may be employed to determine how much the window or door is open.

It will be also understood by a person skilled in the art that many of the details provided above are by way of example only, and are not intended to limit the scope of the invention which is to be determined with reference to the following claims.

What is claimed is:

1. A security alarm system comprising:
a substrate strip mounted on a first of a window/door and framing the substrate strip including a plurality of RFID tags;
a sensor including an RFID reader mounted on a second of the window/door and the framing thereof, a distance between the sensor and respective said RFID tags varying as the window/door is opened; and
a controller, wherein the sensor signals the controller to trigger an alarm when the distance between the sensor and the RFID tags increases beyond a threshold distance;
wherein the sensor is able to read at least a first said RFID tag when the window/door is fully closed, wherein the sensor is no longer able to read the first said RFID tag when the window/door is open a first said threshold distance, wherein the sensor s able to read at least a second said RFID tag when the window/door is open to the first said threshold distance and signals the controller that the window/door is open to the first said threshold distance, wherein when the window/door is open to a second said threshold distance, which is greater than the first said threshold distance, the sensor is no longer able to read the second said RFID tag, and wherein the sensor is able to read at least a third said RFID tag when the window/door is open to the second said threshold distance and signals the controller that the window/door is open to the second said threshold distance, the security alarm system thereby determining how much the window/door is open.

2. The security alarm system as claimed in claim 1, wherein the sensor can read different ones of the RFID tags as the window/door is opened, and the sensor signals the controller a distance that the window/door is opened based on the RFID tags the sensor reads as the window/door is being opened.

3. The security alarm system as claimed in claim 1, wherein the security alarm system is a wireless said security alarm system or a wired said security alarm system.

4. The security alarm system as claimed in claim 1 wherein the sensor signals the controller to trigger said alarm when the sensor cannot read any of said RFID tags.

5. The security alarm system as claimed in claim 1 wherein as the window/door is incrementally opened, the sensor is configured to read only the first said RFID tag, then the first said RFID tag and the second said RFID tag, then only the second said RFID tag, then both the second said RFID tag and the third said RFID tag, and then only the third said RFID tag.

6. The security alarm system as claimed in claim 1, the window/door having a stile and a jamb, wherein the sensor is mounted on a first of the stile and the jamb of the window/door, and wherein the substrate strip is mounted on a second of the stile and the jamb of the window/door.

7. The security alarm system as claimed in claim 1, wherein the sensor includes an elongate housing within which the RFID reader is enclosed, the elongate housing being smaller than and shaped to extend along one of a stile of the window/door and a jamb of the window/door.

8. A security alarm system comprising:
one or more RFID tags connectable to a first of a window/door and framing thereof;
a sensor including an RFID reader, the sensor being connectable to a second of the window/door and the framing such that a distance between the sensor and the one or more RFID tags varies as the window/door is opened; and
a controller to which the sensor signals to trigger an alarm when the distance between the sensor and the one or more RFID tags increases beyond a threshold distance, the sensor on the second of the window/door and the framing being positioned relative to the one or more RFID tags to facilitate ventilation while inhibiting an intruder from passing through said window/door;

wherein the sensor is able to read at least a first said RFID tag when the window/door is fully closed, wherein the sensor is no longer able to read the first said RFID tag when the window/door is open a first said threshold distance, wherein the sensor is able to read at least a second said RFID tag when the window/door is open to the first said threshold distance and signals that the window/door is open to the first said threshold distance, wherein when the window/door is open to a second said threshold distance, which is greater than the first said threshold distance, the sensor is no longer able to read the second said RFID tag, and wherein the sensor is able to read at least a third said RFID tag when the window/door is open to the second said threshold distance and signals that the window/door is open to the second said threshold distance, the security alarm system thereby determining how much the window/door is open.

9. The security alarm system as claimed in claim 8, wherein the security alarm system is a wireless said security alarm system or a wired said security alarm system.

10. The security alarm system as claimed in claim 8, wherein the sensor signals the controller a distance that the window/door is opened based on the one or more RFID tags the sensor reads as the window/door is being opened.

11. The security alarm system as claimed in claim 8, wherein the sensor is able to read the one or more RFID tags as the window/door opens up to the threshold distance.

12. The security alarm system as claimed in claim 8, wherein the threshold distance corresponds to the window/door being partially opened.

13. The security alarm system as claimed in claim 8 wherein the sensor signals the controller to trigger said alarm when the sensor cannot read any of the one or more RFID tags.

14. The security alarm system as claimed in claim 8 wherein as the window/door is incrementally opened, the sensor is configured to read only the first said RFID tag, then the first said RFID tag and the second said RFID tag, then only the second said RFID tag, then both the second said RFID tag and the third said RFID tag, and then only the third said RFID tag.

15. The security alarm system as claimed in claim 8, wherein the sensor includes an elongate housing within which the RFID reader is enclosed, the elongate housing being smaller than and shaped to extend along one of a stile of the window/door and a jamb of the window/door.

16. A method of installing the security alarm system of claim 1, the method comprising:

coupling a first of the substrate strip and the sensor to a first of a window/door and framing thereof;

opening the window/door to a threshold distance which facilitates ventilation and inhibits an intruder from passing through said window/door;

coupling a second of the substrate strip and the sensor on a second of the window/door and the framing such that the sensor is able to read at least one said RFID tag of the substrate strip as the window/door is opened up to said threshold distance; and configuring the controller to which the sensor signals to trigger an alarm when the distance between the sensor and the at least one said RFID tag increases beyond said threshold distance.

17. The method as claimed in claim 16 further comprising:

coupling the second of the substrate strip and the sensor to the second of the window/door and the framing such that the sensor is unable to read the at least one said RFID tag past said threshold distance.

18. The method as claimed in claim 16 further comprising:

coupling the first of the substrate strip and the sensor to a stile of the window/door; and coupling the second of the substrate strip and the sensor to a jamb of the window/door.

19. A security alarm system comprising:

a substrate strip mounted on a first of a window/door and framing thereof, the substrate strip including a plurality of RFID tags;

a sensor including an RFID reader mounted on a second of the window/door and the framing thereof, a distance between the s and respective said RFID tags varying as the window/door is opened; and a control panel, wherein the sensor signals the control panel trigger an alarm when the distance between the sensor and the RFID tags increases beyond a threshold distance;

wherein the sensor is able to read at least a first said RFID tag when the window/door is fully closed, wherein the sensor is no longer able to read the first said RFID tag when the window/door is open a first said threshold distance, wherein the sensor is able to read at least a second said MD tag when the window/door is open to the first said threshold distance and signals the control panel that the window/door is open to the first said threshold distance, wherein when the window/door is open to a second said threshold distance, which is greater than the first said threshold distance, the sensor is no longer able to read the second said RFID tag, and wherein the sensor is able to read at least a third said RFID tag when the window/door is open to the second said threshold distance and signals the control panel that the window/door is open to the second said threshold distance, the security alarm system thereby determining how much the window/door is open.

20. The security alarm system as claimed in claim 19, wherein the security alarm system is a wireless said security alarm system or a wired said security alarm system.

* * * * *

UNITED STATES PATENT AND TRADEMARK OFFICE
CERTIFICATE OF CORRECTION

| | |
|---|---|
| PATENT NO. | : 11,295,584 B2 |
| APPLICATION NO. | : 17/055287 |
| DATED | : April 5, 2022 |
| INVENTOR(S) | : Paul Justin Carlson and Julian Paul Carlson |

It is certified that error appears in the above-identified patent and that said Letters Patent is hereby corrected as shown below:

In the Claims

Column 7 Line 64, Claim 1 and Column 8 Line 8, Claim 1, insert:
--1. A security alarm system comprising: a substrate strip mounted on a first of a window/door and framing thereof, the substrate strip including a plurality of RFID tags; a sensor including an RFID reader mounted on a second of the window/door and the framing thereof, a distance between the sensor and respective said RFID tags varying as the window/door is opened; and a controller, wherein the sensor signals the controller to trigger an alarm when the distance between the sensor and the RFID tags increases beyond a threshold distance; wherein the sensor is able to read at least a first said RFID tag when the window/door is fully closed, wherein the sensor is no longer able to read the first said RFID tag when the window/door is open a first said threshold distance, wherein the sensor is able to read at least a second said RFID tag when the window/door is open to the first said threshold distance and signals the controller that the window/door is open to the first said threshold distance, wherein when the window/door is open to a second said threshold distance, which is greater than the first said threshold distance, the sensor is no longer able to read the second said RFID tag, and wherein the sensor is able to read at least a third said RFID tag when the window/door is open to the second said threshold distance and signals the controller that the window/door is open to the second said threshold distance, the security alarm system thereby determining how much the window/door is open.--

Column 10 Line 23, Claim 19 insert:
--19. A security alarm system comprising: a substrate strip mounted on a first of a window/door and framing thereof, the substrate strip including a plurality of RFID tags; a sensor including an RFID reader mounted on a second of the window/door and the framing thereof, a distance between the sensor and respective said RFID tags varying as the window/door is opened; and a control panel, wherein the sensor signals the control panel to trigger an alarm when the distance between the sensor and the RFID tags increases beyond a threshold distance; wherein the sensor is able to read at least a first said RFID tag when the window/door is fully closed, wherein the sensor is no longer able to read the first said RFID tag when the window/door is open a first said threshold distance, wherein the sensor is able to read at least a second said RFID tag when the window/door is open to the first said Signed and Sealed this
Twenty-fifth Day of October, 2022

*Katherine Kelly Vidal*

Katherine Kelly Vidal
*Director of the United States Patent and Trademark Office* threshold distance and signals the control panel that the window/door is open to the first said threshold distance, wherein when the window/door is open to a second said threshold distance, which is greater than the first said threshold distance, the sensor is no longer able to read the second said RFID tag, and wherein the sensor is able to read at least a third said RFID tag when the window/door is open to the second said threshold distance and signals the control panel that the window/door is open to the second said threshold distance, the security alarm system thereby determining how much the window/door is open.--